United States Patent
Panzica et al.

(10) Patent No.: US 11,287,818 B2
(45) Date of Patent: Mar. 29, 2022

(54) DEPART CONSTRAINTS IMPLEMENTATION IN AUTONOMOUS VEHICLE ROUTING

(71) Applicant: UATC, LLC, San Francisco, CA (US)

(72) Inventors: Adam Panzica, Pittsburgh, PA (US); Xiaodong Zhang, Bentonville, AR (US)

(73) Assignee: UATC, LLC, San Francisco, CA (US)

( * ) Notice: Subject to any disclaimer, the term of this patent is extended or adjusted under 35 U.S.C. 154(b) by 183 days.

(21) Appl. No.: 16/538,275

(22) Filed: Aug. 12, 2019

(65) Prior Publication Data

US 2020/0233415 A1   Jul. 23, 2020

Related U.S. Application Data

(60) Provisional application No. 62/795,734, filed on Jan. 23, 2019.

(51) Int. Cl.
| | | |
|---|---|---|
| G05D 1/00 | (2006.01) | |
| G05D 1/02 | (2020.01) | |
| G01C 21/34 | (2006.01) | |

(52) U.S. Cl.
CPC ....... G05D 1/0088 (2013.01); G01C 21/3461 (2013.01); G05D 1/0212 (2013.01); G05D 1/0291 (2013.01); G05D 2201/0213 (2013.01)

(58) Field of Classification Search
CPC .. G05D 1/0088; G05D 1/0212; G05D 1/0291; G05D 1/0214; G05D 2201/0213; G01C 21/3461; G08G 1/20; G08G 1/207
See application file for complete search history.

(56) References Cited

U.S. PATENT DOCUMENTS

| | | | | |
|---|---|---|---|---|
| 2016/0240087 A1* | 8/2016 | Kube | ..................... | G08G 5/006 |
| 2018/0143643 A1* | 5/2018 | Fairfield | ................ | G01C 21/20 |
| 2019/0385460 A1* | 12/2019 | Magzimof | ........... | G05D 1/0214 |

OTHER PUBLICATIONS

"Nagy, Bryan John, et all, Autonomous Vehicle Routing With Route Extenion, U.S. Appl. No. 16/173,654, filed Oct. 29, 2018, 47 pgs".
"Nagy, Bryan, et al, Autonomous Vehicle Waypoint Routing, U.S. Appl. No. 16/173,633, filed Oct. 29, 2018, 48 pgs".

\* cited by examiner

*Primary Examiner* — Aaron L Troost
(74) *Attorney, Agent, or Firm* — Schwegman Lundberg & Woessner, P.A.

(57) ABSTRACT

A method of controlling navigation of autonomous vehicles includes accessing map data descriptive of the identity and location of different travel ways within a surrounding environment of an autonomous vehicle and accessing constraint data descriptive of one or more geographic areas or geographic identifiers, within the map data, for which associated navigational constraints are defined. The constraint data includes a depart constraint that specifies an area that an autonomous vehicle may not enter but may exit if inside the area when the depart constraint is imposed, thereby preventing the autonomous vehicle from being trapped in a forbidden area even though the autonomous vehicle may safely complete its route. A travel route is determined for the autonomous vehicle based at least in part on the map data evaluated relative to the constraint data including the depart constraint, and motion of the autonomous vehicle is controlled based on the determined travel route.

20 Claims, 21 Drawing Sheets

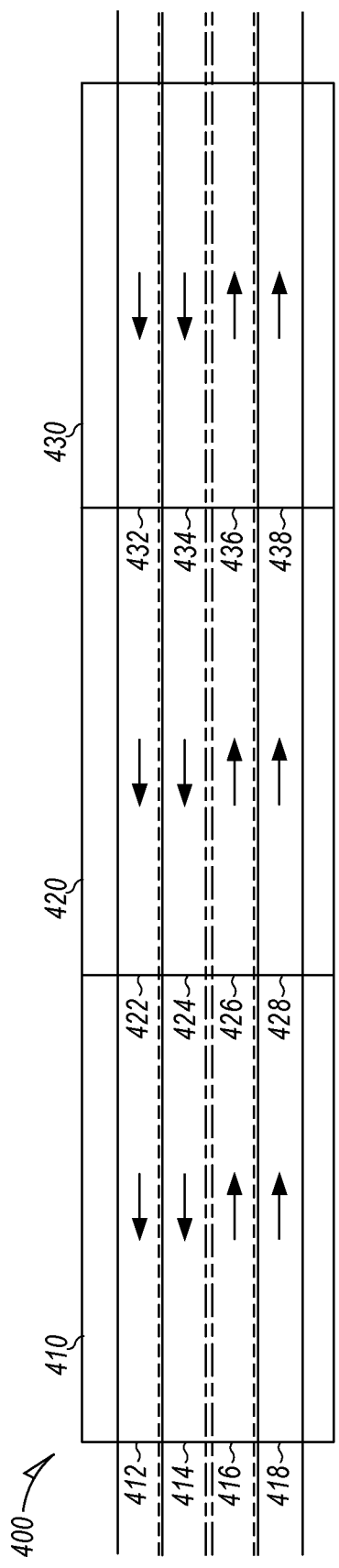
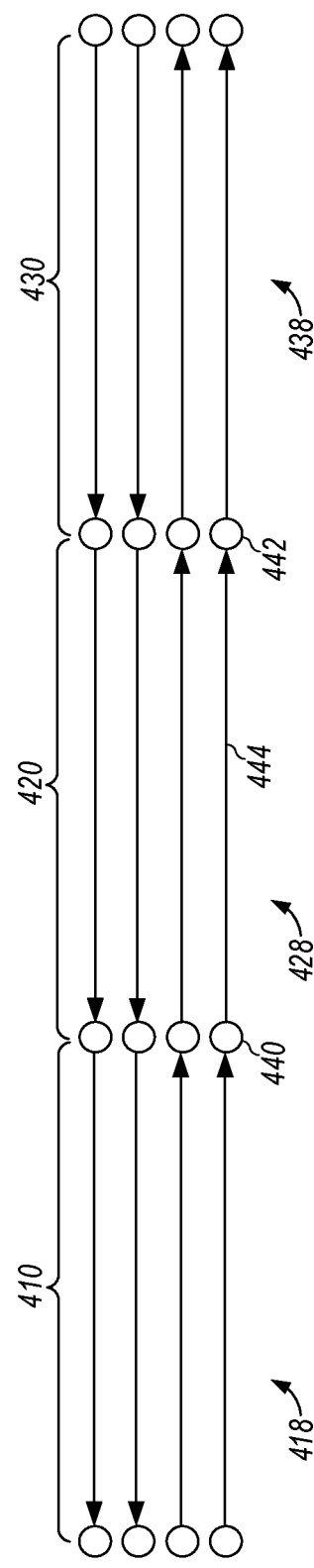

CONSTRAINT FILES — 940
DELETE SERVICE — 947
LICENSED COMPANIES — 948
APPLY

DISTRICT — 941
STRENGTH — 942
SEARCH FILE NAME — 943
ENTER FILE NAME

945 — □ CONSTRAINT FILENAME  DISTRICT  DESCRIPTION

⊗ 2016.09 ANYCITY, LIBERTY... PITTSBURGH

944 — VEHICLE  ADDED  ADDED BY  APPLIED
KEYP10H0002  2016-22-20 15:39:29  BRYAN  FALSE
MM_FUSION  2016-22-20 17:29:15  VEHICLE_SHARE  TRUE

946 — ⊕ 2016.09 ANYCITY, LIBERTY... PITTSBURGH

APPLY CONSTRAINT FILES — 980

982 BY VEHICLE | 984 BY FLEET | 986 BY DISTRICT

PLEASE SELECT VEHICLE(S) ▼
988

CANCEL | APPEND | OVERWRITE

*FIG. 10*

DEPART CONSTRAINTS IMPLEMENTATION IN AUTONOMOUS VEHICLE ROUTING

CLAIM FOR PRIORITY

This application claims the benefit of priority of U.S. Provisional Patent Application Ser. No. 62/795,734, filed Jan. 23, 2019, which is hereby incorporated by reference in its entirety.

CROSS-REFERENCE TO RELATED APPLICATIONS

This application is also related to U.S. patent application Ser. No. 15/783,391, filed Oct. 13, 2017, which claims priority to U.S. Provisional Patent Application Ser. No. 62/503,798, filed May 9, 2017, and U.S. patent application Ser. No. 16/434,501, filed Jun. 7, 2019, which claims priority to U.S. Provisional Patent Application Ser. No. 62/683,191, filed Jun. 11, 2018, all of which are hereby incorporated by reference for all purposes.

FIELD

This document pertains generally, but not by way of limitation, to devices, systems, and methods for operating an autonomous vehicle and, more particularly, to a routing system for autonomous vehicles that implements map constraints including depart constraints that specify an area that an autonomous vehicle may not enter but may exit if inside the area when the constraints are imposed.

BACKGROUND

An autonomous vehicle (AV) is a vehicle that is capable of sensing its environment and operating some or all of the vehicle's controls based on the sensed environment. An AV includes sensors that capture signals describing the environment surrounding the vehicle and a navigation system that responds to the inputs to navigate the AV along a travel route without human input. In particular, an AV can observe its surrounding environment using a variety of sensors and can attempt to comprehend the environment by performing various processing techniques on data collected by the sensors. Given knowledge of its surrounding environment, the AV can determine an appropriate motion plan relative to a travel route through its surrounding environment.

The determination of a travel route along which an AV can navigate can be based at least in part on map data. However, map data is not always updated to reflect changing availability of different travel ways. In addition, map data does not always include additional information about particular events and/or conditions that may affect the navigational availability or preference of particular travel ways in a geographic area.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

FIG. 4 depicts a first example aspect of map data including travel way portions according to example embodiments of the present disclosure;

FIG. 5 depicts second example aspect of map data including travel way portions according to example embodiments of the present disclosure;

FIG. 9 depicts a first example user interface for applying constraint data according to example embodiments of the present disclosure;

FIG. 10 depicts a second example user interface for applying constraint data according to example embodiments of the present disclosure;

DESCRIPTION

Figure 1:
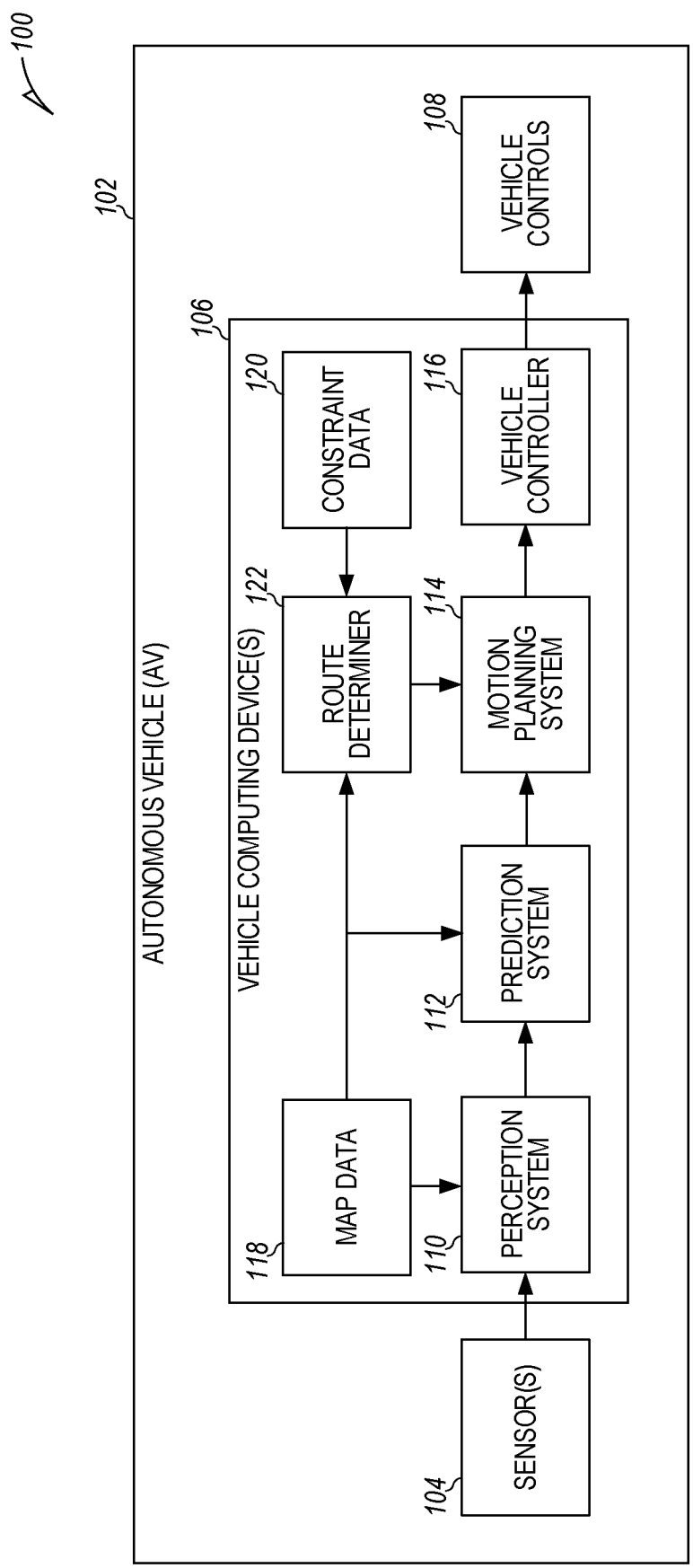
FIG. 1 depicts an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. It will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods that control navigation of autonomous vehicles in accordance with constraint data that identifies geographic areas for inclusion and/or exclusion as permissible areas for navigation by the autonomous vehicles. In particular, the systems and methods of the present disclosure can obtain constraint data descriptive of one or more geographic identifiers (e.g., a polygon encompassing a geographic area and/or a travel way identifier for at least a portion of one or more lanes within a particular travel way) and an application type associated with each geographic identifier. Constraint data can be received, for example, from one or more remote computing devices configured to control operation of a fleet of autonomous vehicles. Map data descriptive of the identity and location of different travel ways within the surrounding environment of the autonomous vehicle can be accessed and evaluated relative to the constraint data in order to determine a travel route for navigating the autonomous vehicle. Motion of the autonomous vehicle then can be controlled based at least in part on the determined travel route.

The disclosed systems and methods can provide a dynamically configurable system for initializing and updating navigational constraints in order to effectively manage autonomous vehicles during specific events (e.g., a traffic accident, sporting event or street fair) and/or specific modes of operation (e.g., with or without human drivers, on-task or off-task from performing a service). In addition, the use of hierarchical constraint data in the form of inclusion and/or exclusion polygons can advantageously provide a flexible configuration for communicating and implementing navigational constraints. As used herein, a constraint is a combination of an effect (what the constraint does) and a shape (where the constraint applies) which is the smallest atomic unit of the navigation constraint system described herein.

More particularly, an autonomous vehicle (e.g., a ground-based vehicle, air-based vehicle, other vehicle type) can include a vehicle computing system that implements a variety of systems including the navigation constraint system described herein. For instance, the vehicle computing system can include one or more sensors (e.g., image capture devices, RADAR devices, LIDAR devices, etc.), one or more computing devices for determining autonomous navigation, and one or more vehicle control system(s) (e.g., for controlling braking, steering, powertrain). The sensor(s) can be configured to obtain sensor data used to detect object(s) including, for example, pedestrians that are located within the travel route (e.g., road) of the autonomous vehicle, travelling in an adjacent travel way (e.g., on a sidewalk, a running path), etc. The sensor data can be indicative of locations associated with the object(s) within the surrounding environment of the autonomous vehicle at one or more time(s). The sensor data can be provided to one or more computing devices in the vehicle computing system.

In addition to the sensor data, the vehicle computing system can retrieve, access, or otherwise obtain map data that provides other detailed information about the surrounding environment of the autonomous vehicle. The map data can provide information regarding the identity and location of different travel ways (e.g., roads, road segments, lanes, lane segments, parking lanes, turning lanes, bicycle lanes, or other portions of a particular travel way). In some examples, travel way portions within accessed map data can include one or more descriptors including, for example, a district identifier, a travel way portion identifier, a start point for the travel way portion, an end point for the travel way portion, a directionality (e.g., direction of traffic flow), and/or connectivity identifiers for other travel way portions that are predecessors and/or successors to a given travel way portion. Map data can also include the identity and location of different items than travel ways, including but not limited to buildings, maintenance/service locations for the autonomous vehicles, parking areas, traffic signs, traffic lights, traffic control devices, and/or any other map data that provides information that assists the vehicle computing system in comprehending and perceiving its surrounding environment and its relationship thereto.

The vehicle computing system can be configured to determine travel routes for the autonomous vehicle based at least in part on the map data. In some examples, travel routes can be determined in accordance with a navigational objective (e.g., traveling to a destination location to perform a service such as a rideshare service, delivery service, courier service, etc.). Because autonomy systems can rely on computer-based determination of travel routes as opposed to human determination, it can sometimes be desirable to implement constraints on particular travel areas that should be either included and/or excluded as permissible for navigation. For example, it may be desirable to exclude specific areas or specific travel ways within an area due to events such as a traffic accident, street fair, construction, or the like. Specific areas may be included as permissible for navigation by particular autonomous vehicles that are assigned to perform services in a given area, thus affording efficient distribution of fleet resources.

In order to implement dynamic navigational constraints, constraint data can provide information descriptive of one or more geographic areas and/or geographic identifiers within map data for which associated navigational constraints are defined. In some examples, the navigational constraints can indicate those areas that should be included and/or excluded from permissible areas for navigation by an autonomous vehicle. In some examples, existing constraint data can be provided at and obtained by one or more computing devices located on-board an autonomous vehicle. In some examples, the constraint data can be received from one or more remote computing devices configured to control operation of a fleet of autonomous vehicles. Constraint data can be the same for some or all vehicles in a fleet, or it can be customized per vehicle depending on factors such as the operation location, operating mode, etc. of each autonomous vehicle.

In sample embodiments, constraint data can be provided in a variety of suitable formats for evaluation by an autonomous vehicle relative to accessible map data. In some implementations, constraint data can be descriptive of one or more geographic identifiers and an application type associated with each of the one or more geographic identifiers. Geographic identifiers can include, for example, one or more polygons encompassing a geographic area, one or more travel way identifiers indicative of at least a portion of one or more lanes within a particular travel way, or other identifiers. In some instances, the application type can indicate either that an associated geographic area can be included in a permissible area for navigation by the autonomous vehicle or that it should be excluded from a permissible area for navigation by the autonomous vehicle.

For example, the application type associated with each geographic identifier can be selected from a predetermined group of application types (e.g., complete inclusion, partial inclusion, complete exclusion, partial exclusion, etc.). In another example, the application type can be selected as a value from within a range of possible application type values (e.g., a number selected from within a range of 0-10 with 0 being least permissible or least preferred and 10 being most permissible or most preferred). In another example, an application type can correspond to an associated cost factor for navigating in a particular geographic area. One or more computing devices associated with an autonomous vehicle can evaluate the associated cost to determine a travel route that minimizes a total cost based at least in part on the cost factor associated with the application type as well as optional additional cost factors, cost functions or the like. Depending on the manner of application type, travel routes can be determined that not only can exclude particular areas from navigation but that additionally or alternatively can reduce traffic in particular areas based at least in part on evaluation of the constraint data.

The use of polygonal constraint data is an example approach that provides a highly flexible manner of defining constraints. Instead of having to list out numerous different travel way portion identifiers for inclusion or exclusion in a given area, polygons can be created to more broadly define geographic areas for inclusion and/or exclusion. The number of vertices, number of edges, and/or overall shape of a polygon encompassing a particular geographic area can be customized in numerous ways to accomplish specific navigational constraint objectives. In addition, polygons can be assigned to a constraint set characterized by a default state (e.g., inclusion for permitted travel, exclusion for forbidden travel). By using polygonal constraint data, multiple travel way portions can be determined as included and/or excluded based on the location and application type associated with each polygon and the default state for the constraint set containing each polygon. For instance, permitted travel way portions can be determined as those travel way portions that are described by a constraint set having a default "permit" state and/or that are completely enclosed by a complete inclusion polygon and/or that are completely enclosed or partially touched by a partial inclusion polygon. Forbidden travel way portions can be determined as those travel way portions that are described by a constraint set having a default "forbid" state and/or that are completely enclosed by a complete exclusion polygon and/or that are completely enclosed or partially touched by a partial exclusion polygon.

In some examples, constraint data can be determined, evaluated or otherwise considered by a vehicle computing system based on a current mode of operation for an autonomous vehicle. Different modes of operation can include, for example, a fully autonomous mode in which the autonomous vehicle operates without a human driver present in the vehicle, an autonomous mode in which the autonomous vehicle operates with a human driver in the vehicle, or other modes. In some implementations, constraint data can include a priori map constraints identifying that an autonomous vehicle should be excluded from making a left hand turn in particular turn lanes of a given travel way or travel way portion when a vehicle is operating in a particular mode. Different modes of operation can additionally or alternatively include, for example, whether a vehicle is currently engaged or not engaged in performing a service. For instance, some vehicles may currently have passengers on board that are being driven from one location to another, while other vehicles may be engaged in controlled navigation but are not currently engaged in a particular operational task. Constraint data may selectively include on-task autonomous vehicles to navigate in a particular area while excluding autonomous vehicles that are off-task.

Composite constraint data can be generated by modifying existing constraint data accessed by an autonomous vehicle based at least in part on one or more constraint files received, for example, from one or more remote computing devices remote from the autonomous vehicle. The one or more constraint files can be descriptive of additional navigational constraints for one or more geographic areas and/or geographic identifiers. For example, each constraint file may include a constraint set including zero or more geographic identifiers (e.g., polygons having boundaries defined relative to a geographic area and having an associated application type) as well as a default state indicating whether to by default permit or forbid areas described by the constraint file. The application type associated with each geographic identifier (e.g., polygon) can describe how to evaluate the geographic identifier relative to map data. For example, an inclusion type can indicate that travel way portions within map data that are enclosed or touched by an inclusion polygon should be permitted. An exclusion type can indicate that travel way portions within map data that are enclosed or touched by an exclusion polygon should be forbidden. A complete type can indicate that travel way portions within map data that are completely enclosed by a polygon should be permitted or forbidden. A partial type can indicate that travel way portions within map data that are completely enclosed or even just partially touched by a polygon should be permitted or forbidden. Also, as described more fully below, a depart type constraint may be applied to indicate that an area may not be entered by an autonomous vehicle but that an autonomous vehicle may depart the area if inside the area when the constraints are imposed.

After an autonomous vehicle obtains constraint data, one or more computing systems located on-board or off-board the autonomous vehicle can determine a travel route for navigating the autonomous vehicle. The travel route can be determined at least in part from map data that is evaluated relative to the composite constraint data. For example, the map data can be evaluated in association with the composite constraint data to determine which travel way portions are permitted and which travel way portions are forbidden. A travel route can be determined that never incorporates a forbidden travel way portion. The determined travel route can include, for example, a sequence of multiple travel way portions along which an autonomous vehicle can navigate, for example, to accomplish a predetermined navigational objective. Each travel way portion within a determined travel route can be defined by one or more of a travel way identifier, a start point, an end point, a directionality, and/or connectivity identifiers for predecessor and/or successor travel way portions.

Once a travel route is determined, a vehicle computing system can determine a motion plan to control motion of the autonomous vehicle along the determined travel route. The motion plan can be further based on any objects proximate to the autonomous vehicle (e.g., pedestrians, other vehicles, traffic control devices, etc.) that are detected by the vehicle's sensors, image capture devices, or other data acquisition system components. For instance, the vehicle computing system can be a computing system that includes various sub-systems that cooperate to perceive the surrounding environment of the autonomous vehicle and determine a motion plan for controlling the motion of the autonomous vehicle. For instance, the vehicle computing system can include a perception system, a prediction system, and a motion planning system.

In other implementations of the disclosed systems and methods, one or more remote computing devices can be configured to implement systems and method of controlling operation of one or more autonomous vehicles. In some examples, such remote computing device(s) can be included as part of a central control system that is in wireless communication with a plurality of autonomous vehicles, such as a fleet of autonomous vehicles providing one or more services (ride share service, delivery service, courier service, etc.). The one or more remote computing devices can create a constraint set with zero or more geographic identifiers and a default state (e.g., permit or forbid or depart) that indicates whether to by default permit or forbid areas or instruct the autonomous vehicle to immediately depart the area described by the constraint file. The one or more remote computing devices can identify an event at some geographic location that will impact navigation at such location (e.g., a street fair, sporting event, traffic accident, bridge closure, parade, etc.). The one or more remote computing devices can then determine constraint data associated with the identified event. For example, constraint data can be determined including one or more geographic identifiers such as polygons having boundaries defined relative to a geographic area including the location of the event identified. In some examples, at least one such polygon can encompass a geographic area including the location of the identified event. The one or more geographic identifiers (e.g., polygons) can include an associated application type (e.g., complete inclusion, partial inclusion, complete exclusion, partial exclusion). The one or more remote computing devices then can assign the one or more geographic identifiers to the constraint set and transmit the constraint data to one or more autonomous vehicles over a network.

Identification of events, for which the disclosed constraint data can be determined can come from data descriptive of an upcoming event (e.g., sporting event, bridge closure, parade, or the like) and/or historical data (e.g., by approximating navigational limitations based on past events in a particular geographic region at a certain time and/or date). The one or more remote computing devices can utilize various databases to predict, approximate, and/or determine the events and/or geographic locations of anticipated navigational limitations. For example, for different geographic regions, event information (e.g., location, time, and/or date of the event, or the like) can be stored in an event database. Event information can be indicative of whether traffic can be higher or lower at a certain time period (e.g., a time period before the event begins versus a time period when the event is ongoing). In another example, event information can come from calendar databases that indicate important dates (e.g., holidays, first days of school for a city, voting day, or the like). Other examples of outside sources or other stored data (e.g., predicted future, current and/or historic events, conditions, or the like) include weather conditions, news information (e.g., fires, emergency situations, or the like), social information (e.g., via social networking websites), traffic conditions, flight information from airports and/or airlines, or the like, or other information that can assist in determining event information, traffic patterns or other data contributing to potential navigational constraints.

The systems, methods, and vehicles described herein may provide a number of technical effects and benefits. For instance, the vehicle computing system can locally (e.g., on-board the vehicle) obtain constraint data, evaluate map data relative to the constraint data, and determine a travel route for navigating the autonomous vehicle in compliance with the constraint data. By performing such operations on-board the autonomous vehicle, the vehicle computing system can avoid certain latency issues that arise by reliance on a remote computing system for off-board operations. For example, the vehicle computing system can be configured to initialize and update its travel route(s) based on obtained constraint data and accessible map data as opposed to waiting for determined travel routes to be approved or disapproved by a central command or other remote computing device/system. As such, map data can be evaluated relative to constraint data and travel routes can be determined with increased computational efficiency.

The systems, methods, and vehicles described herein have an additional technical effect and benefit of providing a flexible and customizable approach to defining included and/or excluded geographic areas for navigation by an autonomous vehicle. By communicating constraints to an autonomous vehicle from one or more remote computing devices, a fleet operator associated with the remote computing devices is afforded flexibility in controlling navigation. Fleet operators have the flexibility of sending instructions to an entire fleet of vehicles operating in a given geographic area, to just one autonomous vehicle, or to a subset of vehicles. Fleet operators can provide inclusion areas and/or exclusion areas to an autonomous vehicle in real time or near real time to account for numerous dynamically changing events (e.g., a traffic accident, construction, street fair, parade, bridge closure, etc.) and/or specific modes of operation (e.g., operation of the autonomous vehicle with or without human drivers). This dynamic approach helps autonomous vehicles adjust their travel routes in real time or near real time without having to regenerate limitations within map data or require autonomous vehicles to return to a central command center to upload new maps.

In some implementations, polygonal constraint data can provide a highly flexible manner of defining constraints whereby geographic areas for inclusion and/or exclusion can be more broadly defined as opposed to listing out numerous specific travel way portion identifiers. Inclusion areas and/or exclusion areas can be added and/or removed from constraint data one at a time in order to provide flexible updates to one or more autonomous vehicles, thus reducing the amount of data communicated remotely to an autonomous vehicle. In addition, constraint data can be defined that is customized based on location in order to account for travel way design, operational parameters, events, etc. that are different from city to city, country to country or the like.

The systems, methods, and vehicles described herein have an additional technical effect and benefit of providing more efficient navigation while simultaneously enhancing the safety and security of autonomous vehicles, passengers and/or cargo. By providing a mechanism to obtain constraint data, autonomous vehicles can benefit from the knowledge of when and where potential problem areas may exist for travel routes. A vehicle computing system can determine optimized travel routes or update travel routes in an enhanced manner by evaluating map data relative to current constraint data in order to avoid exclusion areas. By planning ahead to avoid such areas, the potential for navigational back-tracking is reduced. In addition, by avoiding exclusion areas that are identified because of certain events (e.g., traffic accidents, protestor demonstrations, parades, bridge closures, etc.), and by enabling the autonomous vehicle to drive out of a depart constraint area, the safety of vehicles, passengers, and/or cargo can be increased.

The systems, methods, and vehicles described herein also provide an improvement to vehicle computing technology, such as autonomous vehicle computing technology. For instance, aspects of the present disclosure enable a vehicle computing system to more efficiently and accurately control the vehicle's motion. By planning which travel way portions (e.g., turn lanes, narrow lanes, lanes with blind spots, etc.) that an autonomous vehicle should use or avoid based in part on obtained constraint data, motion plans can be determined in advance along an ideal travel route. Improved autonomy and effective determination of a vehicle travel route and motion plan can be a primary factor in achieving enhanced overall operation of an autonomous vehicle.

During normal fleet operations of autonomous vehicles, it may become necessary to react to changes to the operating environment that restrict the valid operating environment for the autonomous vehicles. These changes are often transient in nature and thus are not desirable to be included in the map. Examples range from construction zones, to sinkholes, to parades. The primary tools for addressing such changes is to employ Forbid Routing (FBR) (an effect that completely prevents (excludes) routing in the affected area) and High Cost/Avoid (HCA) (an effect that causes the affected area to be "more expensive" to traverse whereby the affected routes would be less likely to be traversed in the affected area) constraints. Other constraints may include forced manual from Auto/Routable Non-Auto (RNA) where RNA lanes can be used to route but only for manual driving. By using the navigation constraints system described herein, operators may annotate the map dynamically and alter the routing behavior of one or more autonomous vehicles. By way of example only, the routing systems described in U.S. patent application Ser. Nos. 16/173,654 and 16/173,633 are exemplary and are incorporated herein by reference.

A Navigation Constraints System (NCS) as described herein is the primary tool used in order to decide where in a lane graph it is permissible for a route to traverse, as well as what mode the AV should be in while it traverses the route. The NCS can be utilized by operators in order to affect the behavior of an autonomous vehicle fleet dynamically, but it also may be used to block off certain portions of the map of an autonomous vehicle that may not be used due to organizational policies or autonomy capabilities.

However, there are limitations to these NCS tools in certain operating environments. For example, High Cost/Avoid is merely a suggestion. It will, on average, cause the autonomous vehicle(s) to avoid an area, but it will not prevent them from entering it. On the other hand, Forbid Routing is an absolute. Autonomous vehicles will never traverse lanes marked as FBR, for any reason. This becomes especially problematic in an autonomous vehicle setting where there is no human operator as it is possible that constraints may be applied that will strand the autonomous vehicle by constraining travel in the area the autonomous vehicle is currently occupying. In this situation, the only safe thing the autonomous vehicle can do is to perform a safe stop, because it must assume that the FBR constraint was applied for a reason, and it is no longer safe to continue traversing that area.

While performing a safe stop may be the appropriate action in certain emergency situations, it is quite possible that the autonomous vehicle could safely maneuver out of a constrained area without jeopardizing the safety of the occupants of the autonomous vehicle. For example, when a safety driver is in the autonomous vehicle, the autonomous vehicle may require the human operator to actually push a button to apply new constraints and ask the human operator not to do this until they are not executing a mission. This means that before they accept the constraints, the human is trusted to handle any unsafe conditions which the new constraints may have been trying to communicate and make the autonomous vehicle avoid. After the constraints are accepted, the human safety operator may simply drive the vehicle back into the "allowed" operating area if it becomes stranded due to the new constraints. However, in the absence of the human driver, the autonomous vehicle would otherwise be stranded in the forbidden area and system operators must try to avoid pushing constraints they know will strand an autonomous vehicle and passengers. This situation also presents a safety concern because it delays communicating possibly safety-critical information to the rest of the autonomous vehicle fleet in an emergency situation.

The inventors have recognized that there are many situations where an FBR constraint is applied but the operators do not actually mean "do not enter this area and the only safe thing to do in this area is stop moving." What they actually mean is "do not enter this area and exit it if you are currently in it." For example, in the case of a planned parade route, it is undesirable for an autonomous vehicle to enter the parade route after the constraints annotating the parade route have been deployed. On the other hand, it is perfectly appropriate that any autonomous vehicle currently traversing the parade route be allowed to continue moving, so long as the autonomous vehicle exits the area of the parade route as expediently as possible as there is no immediate safety risk. Constraints for implementing such a feature are described herein as depart constraints that are associated with an area to indicate that the area can be traversed by autonomous vehicles already inside the area when the constraints are imposed, that the area can be exited by autonomous vehicles already inside the area, that autonomous vehicles outside the area cannot enter the area after the depart constraints are imposed, and that traversal should bias towards exiting the area as expediently as practical.

Sample embodiments described herein include a computer-implemented method of controlling navigation of an autonomous vehicle to impose constraints including such depart constraints. The method includes accessing map data descriptive of the identity and location of different travel ways within a surrounding environment of the autonomous vehicle and constraint data descriptive of one or more geographic areas or geographic identifiers, within the map data, for which associated navigational constraints are defined. In the sample embodiments, the constraint data includes a depart constraint that specifies an area that an autonomous vehicle may not enter but may exit if inside the area when the depart constraint is imposed. One or more processors determine a travel route for navigating the autonomous vehicle based at least in part from the map data evaluated relative to the constraint data including the depart constraint and controls motion of the autonomous vehicle based at least in part on the determined travel route.

The method includes imposing the depart constraint on a lane in the map data, the depart constraint indicating that an autonomous vehicle in the lane may continue to traverse the lane while inside the lane and may exit the lane but that an autonomous vehicle outside of the lane may not enter the lane. The lane is given a high traversal cost to bias an autonomous vehicle in the lane towards exiting the lane.

The method further includes receiving one or more constraint files including the constraint data from one or more remote computing devices configured to control operation of a fleet of autonomous vehicles. In sample embodiments, each of the one or more constraint files includes one or more polygons, each polygon having a boundary defined relative to a geographic area and an associated application type. In the sample embodiments, determining the travel route for navigating the autonomous vehicle may further include determining, by the one or more processors, permitted travel way portions, the permitted travel way portions being described by constraint data as (i) having a default permit state, (ii) being completely enclosed by a complete inclusion polygon, or (iii) being completely enclosed or partially touched by a partial inclusion polygon and determining, by the one or more processors, forbidden travel way portions, the forbidden travel way portions being described by the constraint data as (i) having a default forbid state, (ii) being completely enclosed by a complete exclusion polygon, or (iii) being completely enclosed or partially touched by a partial exclusion polygon. The one or more processors evaluate the map data to account for the permitted travel way portions and the forbidden travel way portions.

In further sample embodiments, the one or more remote computing devices generate a map constraint interface enabling a fleet operator to update map constraints for autonomous vehicles (AVs), the map constraint interface enabling the fleet operator to configure a set of constraint layers of one or more autonomy maps utilized by the AVs for navigation, where each constraint layer in the set of constraint layers comprises a toggle feature that enables the fleet operator to activate and deactivate the constraint layer. A set of inputs configuring the set of constraint layers of the one or more autonomy maps is received via the map constraint interface and a set of map constraints corresponding to the configured set of constraint layers is compiled into a document container that is output via a communication interface over one or more networks to a subset of the AVs to enable the subset of AVs to integrate the set of map constraints with the one or more autonomy maps.

The disclosure described herein further describes a corresponding computing system and computer-readable media for controlling navigation of an autonomous vehicle and an autonomous vehicle including such a computing system.

Further sample embodiments include a computing device for controlling one or more autonomous vehicles. The computing device receives from one or more networks traffic flow constraint information from at least one of a central planning resource or a traffic monitoring resource. Based on the traffic flow constraint information, autonomy map constraints for autonomous vehicles operating in a given region are updated. The autonomy map includes constraint data defining constraints descriptive of one or more geographic areas or geographic identifiers for which associated navigational constraints are defined, and the constraint data includes a depart constraint that specifies an area that an autonomous vehicle may not enter but may exit if inside the area when the depart constraint is imposed. The data indicating the autonomy map constraints is transmitted over the one or more networks to the one or more autonomous vehicles. In sample embodiments, the data indicating the autonomy map constraints is selectively transmitted to the one or more autonomous vehicles based on the one or more autonomous vehicles each being on a current route converging towards or intersecting with a road segment closure defined by the autonomy map constraints.

In the sample embodiments, a constraint file comprising the constraint data is generated and transmitted to the one or more autonomous vehicles. The traffic flow constraint information identifies a planned event that corresponds to a road segment closure within the given region. The planned event may correspond to at least one of road construction or utility servicing and may comprise at least one of a protest, a parade, a sporting event, and a festival. The traffic flow constraint information also may be received from a live, crowded-sourced traffic resource.

The disclosure described herein further describes corresponding methods and computer-readable media for controlling navigation of an autonomous vehicle.

With reference now to the Figures, example embodiments of the present disclosure will be discussed in further detail. FIG. 1 depicts an example vehicle computing system 100 of an autonomous vehicle 102 according to example embodiments of the present disclosure. The autonomous vehicle 102 incorporating the vehicle computing system 100 can be a ground-based autonomous vehicle (e.g., car, truck, bus), an air-based autonomous vehicle (e.g., airplane, drone, helicopter, or other aircraft), or other type of vehicles (e.g., watercraft). The autonomous vehicle 102 can be configured to drive, navigate, operate, etc. with minimal and/or no interaction from a human driver. For example, the autonomous vehicle 102 can be configured to operate in one or more mode(s) such as, for example, a fully autonomous operational mode and/or a semi-autonomous operational mode. A fully autonomous (e.g., self-driving) operational mode can be one in which the autonomous vehicle 102 can provide driving and navigational operation with no interaction from a human driver. A semi-autonomous operational mode can be one in which the autonomous vehicle 102 can operate with some interaction from a human driver present in the vehicle. In some implementations, the autonomous vehicle 102 can be associated with an entity (e.g., a service provider) that provides one or more vehicle service(s) to a plurality of users via a fleet of vehicles that includes, for example, the autonomous vehicle 102. The vehicle service(s) can include transportation services (e.g., rideshare services), courier services, delivery services, and/or other types of services. The vehicle service(s) can transport and/or deliver passengers as well as items such as but not limited to food, animals, freight, purchased goods, etc.

As further illustrated in FIG. 1, the vehicle computing system 100 can include one or more sensors 104, one or more computing devices 106 and one or more vehicle controls 108. One or more of these systems can be configured to communicate with one another via a communication channel. The communication channel can include one or more data buses (e.g., controller area network (CAN)), diagnostics connector (e.g., OBD-11), and/or a combination of wired and/or wireless communication links. Any on-board systems can send and/or receive data, messages, signals, etc. amongst one another via the communication channel. The one or more computing devices 106 can include a perception system 110, a prediction system 112, and a motion planning system 114 that cooperate to perceive the surrounding environment of the autonomous vehicle 102 and to determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102 (e.g., at one or more times).

As one example, for a LIDAR system, the sensor data from sensor(s) 104 can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data from sensor(s) 104 can include the location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the computing device(s) 106 can retrieve or otherwise obtain map data 118 that provides detailed information about the surrounding environment of the autonomous vehicle 102. The map data can provide information regarding the identity and location of different travel ways (e.g., roads, road segments, lanes, lane segments, parking lanes, turning lanes, bicycle lanes, or other portions of a particular travel way). In some examples, travel way portions within accessed map data can include one or more descriptors including, for example, a travel way portion identifier, a start point for the travel way portion, an end point for the travel way portion, a directionality (e.g., direction of traffic flow), and/or connectivity identifiers for other travel way portions that are predecessors and/or successors to a given travel way portion. Map data can also include the identity and location of different items than travel ways, including but not limited to buildings, maintenance/service locations for the autonomous vehicles, parking areas, traffic signs, traffic lights, traffic control devices, and/or any other map data that provides information that assists the computing system in comprehending and perceiving its surrounding environment and its relationship thereto. An example depiction of map data 118 for given travel way portions is provided in FIGS. 4-5 and will be discussed below.

The computing device(s) 106 also can retrieve or otherwise obtain constraint data 120 that provides information descriptive of one or more geographic areas and/or geographic identifiers within a map for which associated navigational constraints are defined. In some examples, constraint data 120 can identify geographic areas within map data 118 that should be included and/or excluded from permissible areas (or preferred and/or not preferred) for navigation by autonomous vehicle 102. For instance, constraint data 120 can include instructions for excluding or reducing travel in specific areas or specific travel ways within an area due to events such as a traffic accident, street fair, construction, parade, bridge closure, or the like. Constraint data 120 can alternatively include instructions for including specific areas or specific travel ways as permissible for navigation by particular autonomous vehicles assigned to perform services in a given area, thus affording efficient distribution of fleet resources. Additional description regarding more particular types and examples of constraint data 120 is provided relative to FIGS. 6-10.

The computing device(s) 106 can also include a route determiner 122 configured to determine travel routes for the autonomous vehicle 102 based at least in part on the map data 118 evaluated relative to the constraint data 120. In some examples, travel routes can be determined by route determiner 122 in accordance with a navigational objective (e.g., traveling to a destination location to perform a service such as rideshare service, delivery service, courier service, etc.). Route determiner 122 can evaluate the map data 118 in association with the constraint data 120 to determine which travel way portions are included and/or which travel way portions are excluded. The determined travel route can include, for example, a sequence of multiple permitted travel way portions along which an autonomous vehicle can navigate, for example, to accomplish a predetermined navigational objective. Each travel way portion within a determined travel route can be defined by one or more of a travel way identifier, a start point, an end point, directionality, and/or connectivity identifiers for predecessor and/or successor travel way portions.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information. In some implementations, the perception system 110 can determine state data for each object over a number of iterations. In particular, the perception system 110 can update the state data for each object at each iteration. Thus, the perception system 110 can detect and track objects (e.g., vehicles) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the travel route determined by route determiner 122 and/or the predicted one or more future locations for the object and/or the state data for the object provided by the perception system 110. Stated differently, given information about the current locations of objects and/or predicted future locations of proximate objects, as well as a predetermined travel route, the motion planning system 114 can determine a motion plan for the autonomous vehicle 102 that best navigates the autonomous vehicle 102 along the determined travel route relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 strikes another object and/or deviates from a preferred pathway (e.g., a predetermined travel route).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the motion plan that minimizes the cost function can be selected or otherwise determined. The motion planning system 114 can provide the selected motion plan to a vehicle controller 116 that controls one or more vehicle controls 108 (e.g., actuators or other devices that control gas flow, steering, braking, etc.) to execute the selected motion plan.

Each of the perception system 110, the prediction system 112, the motion planning system 114, the vehicle controller 116, and the route determiner 122 can include computer logic utilized to provide desired functionality. In some implementations, each of the perception system 110, the prediction system 112, the motion planning system 114, the vehicle controller 116, and the route determiner 122 can be implemented in hardware, firmware, and/or software controlling a general-purpose processor. For example, in some implementations, each of the perception system 110, the prediction system 112, the motion planning system 114, the vehicle controller 116 and the route determiner 122 includes program files stored on a storage device, loaded into a memory and executed by one or more processors. In other implementations, each of the perception system 110, the prediction system 112, the motion planning system 114, the vehicle controller 116, and the route determiner 122 includes one or more sets of computer-executable instructions that are stored in a tangible computer-readable storage medium such as RAM hard disk or optical or magnetic media, as is further described in FIG. 2.

Figure 2:
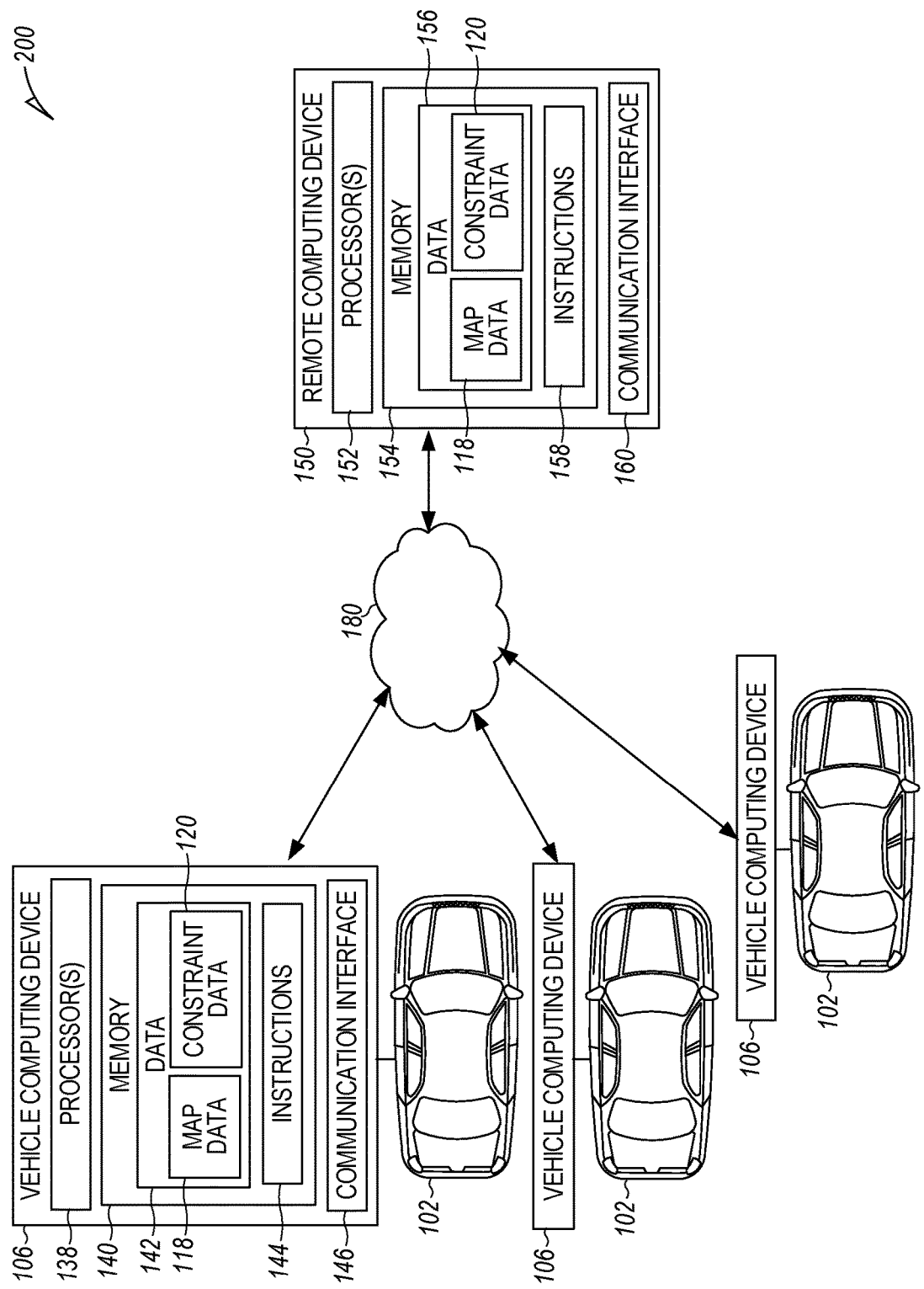
FIG. 2 depicts an example system for communicating map data and constraint data according to example embodiments of the present disclosure.

FIG. 2 depicts a block diagram of an example computing system 200 according to example embodiments of the present disclosure. In particular, FIG. 2 illustrates an example implementation of the present disclosure in which one or more remote computing devices 150 are communicatively coupled with one or more vehicle computing devices 106 over a network 180. Each vehicle computing device 106 can be part of a vehicle computing system 100 associated with a particular autonomous vehicle 102. It should be appreciated that FIG. 2 illustrates only one example computing system 200 that can be used to implement the present disclosure. Other computing systems can be used as well.

Each vehicle computing device 106 can include one or more processors 138 and a memory 140. The one or more processors 138 can be any suitable processing device (e.g., a processor core, a microprocessor, an ASIC, a FPGA, a controller, a microcontroller, etc.) and can be one processor or a plurality of processors that are operatively connected. The memory 140 can include one or more non-transitory computer-readable storage mediums, such as RAM, ROM, EEPROM, EPROM, flash memory devices, magnetic disks, etc., and combinations thereof. The memory 140 can store data 142 and instructions 144 which are executed by the processor 138 to cause the vehicle computing device 106 to perform operations. Data 142 can include map data 118 and constraint data 120.

The vehicle computing device(s) 106 can obtain map data 118 and/or constraint data 120 via interaction with the remote computing device(s) 150 that are communicatively coupled over the network 180. The remote computing device(s) 150 can be separate from the vehicle computing device(s) 106 and provided in a location remote from the vehicle computing device(s) 106, for instance, in a central control system associated with a service provider, owner, and/or fleet operator controlling a fleet of autonomous vehicles 102.

The remote computing device(s) 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the remote computing device(s) 150 to perform operations. The data 156 can include map data 118 and constraint data 120 that is relayed over network 180 to one or more vehicle computing devices 106 associated with respective autonomous vehicles 102.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). In some examples, vehicle computing device(s) 106 and/or remote computing device(s) 150 can further include one or more communication interfaces 146, 160, including any suitable components (transmitters, receivers, ports, controllers, antennas, etc.) for interfacing with network 180 or one or more other networks.

Figure 3:
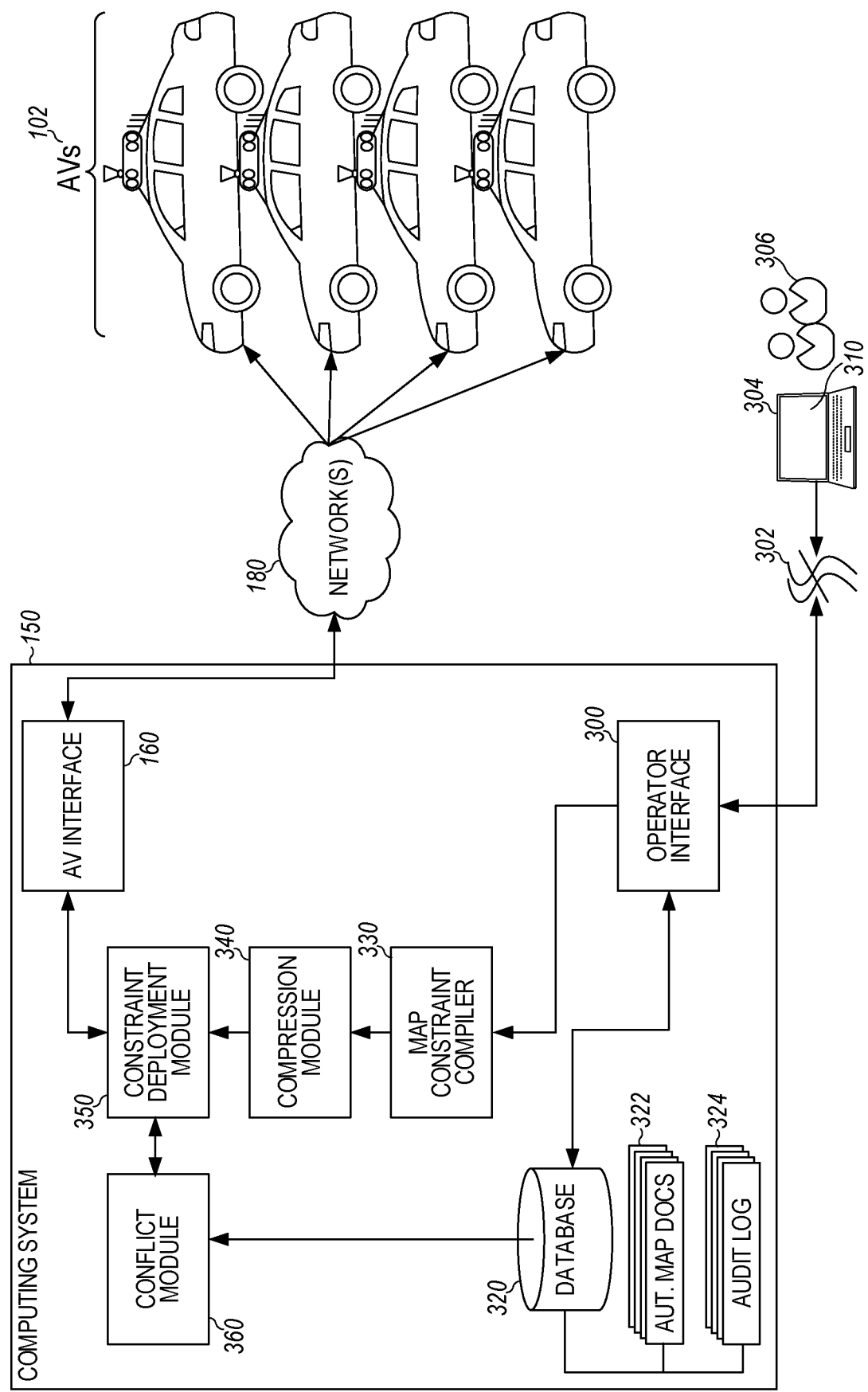
FIG. 3 depicts an example system for outputting map constraints to AVs according to example embodiments of the present disclosure.

FIG. 3 depicts an example computer system for outputting map constraints to AVs, according to example embodiments of the present disclosure. As illustrated, computing system 150 may be adapted to include AV communication interface 160 that communicates with a fleet of AVs 102 via one or more networks 180. The computing system 150 further includes a fleet operator interface 300 connected over a network 302 with a computing device 304 operable by fleet operators 306. The computing device 304 can display a map constraint interface 310 enabling the fleet operators 306 to configure map constraints to be merged into the autonomy maps utilized by the AVs 102. The computing system 150 can further include a database 320 storing autonomy map documents 322 and audit logs 324, as described herein. The computing system 150 can further include a map constraint compiler 330, a compression module 340, and a constraint deployment module 350. In certain aspects, the computing system can further include a conflict module 360 that assures a deployed document container does not conflict with other applicable policies and/or map constraints, which may result in an error condition.

FIGS. 4-5 depict first and second example aspects of map data 118, particularly map data relative to the illustrated travel way portions, according to example embodiments of the present disclosure. As previously described, map data 118 can include a wealth of information regarding the identity and location of different travel ways (e.g., roads, road segments, lanes, lane segments, parking lanes, turning lanes, bicycle lanes, or other portions of a particular travel way), buildings, maintenance/service locations for the autonomous vehicles, parking areas, traffic signs, traffic lights, traffic control devices, and/or any other map data that provides information that assists the computing system in comprehending and perceiving its surrounding environment and its relationship thereto. The particular identifiers discussed in FIGS. 4-5 for representing map data 118 can also be used to represent constraint data 120 and/or travel routes determined by route determiner 122.

FIG. 4 illustrates information about each travel way within map data 118 can be provided in detailed form. For instance, a portion of road 400 can be represented within map data 118 as a plurality of road segments 410, 420, and 430. Each road segment can respectively include one or more lanes. In the example of FIG. 4, road segment 410 includes two lane segments 412 and 414 associated with travel in a first direction and two lane segments 416 and 418 associated with travel in a second direction (e.g., opposing the first direction). Road segment 420 includes two lane segments 422 and 424 associated with travel in a first direction and two lane segments 426 and 428 associated with travel in a second direction (e.g., opposing the first direction). Road segment 430 includes two lane segments 432 and 434 associated with travel in a first direction and two lane segments 436 and 438 associated with travel in a second direction (e.g., opposing the first direction).

Referring now to FIG. 5, each travel way within map data 118 can be defined using additional and/or alternative data than depicted in FIG. 4. For instance, each travel way portion (e.g., lane segments 412-418, 422-428, 432-428) can include a lane segment identifier, a road segment identifier, a district identifier, a start point, an end point, a directionality vector indicating a direction of traffic flow between start and end points, and/or connectivity identifiers for other travel way portions that are predecessors and/or successors thereto. For example, lane segment 428 can be defined using lane segment identifier 428, road segment identifier 420, road identifier 400, start point 440, end point 442, a directionality vector 444 indicating the direction of traffic flow between start point 440 and end point 442, and an indication that lane segment 428 is connected to predecessor lane segment 418 (of road segment 410) and successor lane segment 438 (of road segment 430).

In some implementations, map data 118, constraint data 120 and/or travel routes determined by route determiner 122 can be identified in terms of particular districts or coverage areas that include some or all of such data. For instance, travel way portion identifiers such as described, for example, in FIGS. 4-5 can be additionally identified in terms of what district or coverage area they are included in. By breaking a map down into different districts or coverage areas, the disclosed systems and methods can more easily identify which portions of map data 118 need to be evaluated relative to constraint data 120 to determine appropriate travel routes.

Figure 6:
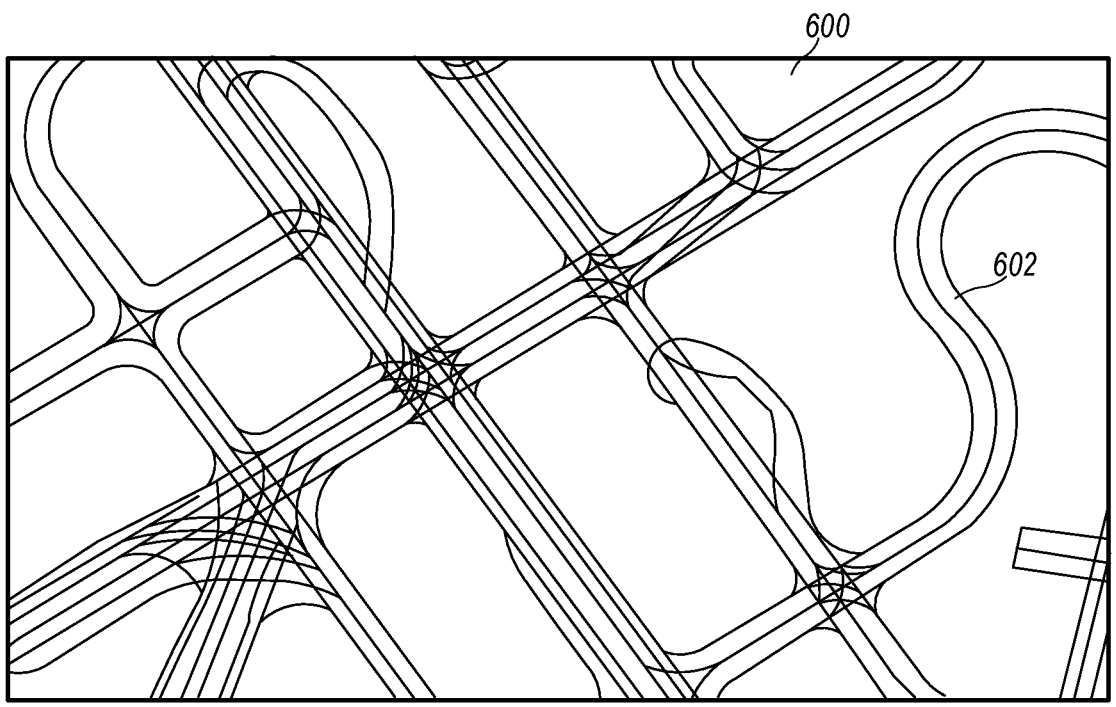
FIG. 6 depicts a third example aspect of map data including an example geographic location according to example embodiments of the present disclosure.
Figure 7:
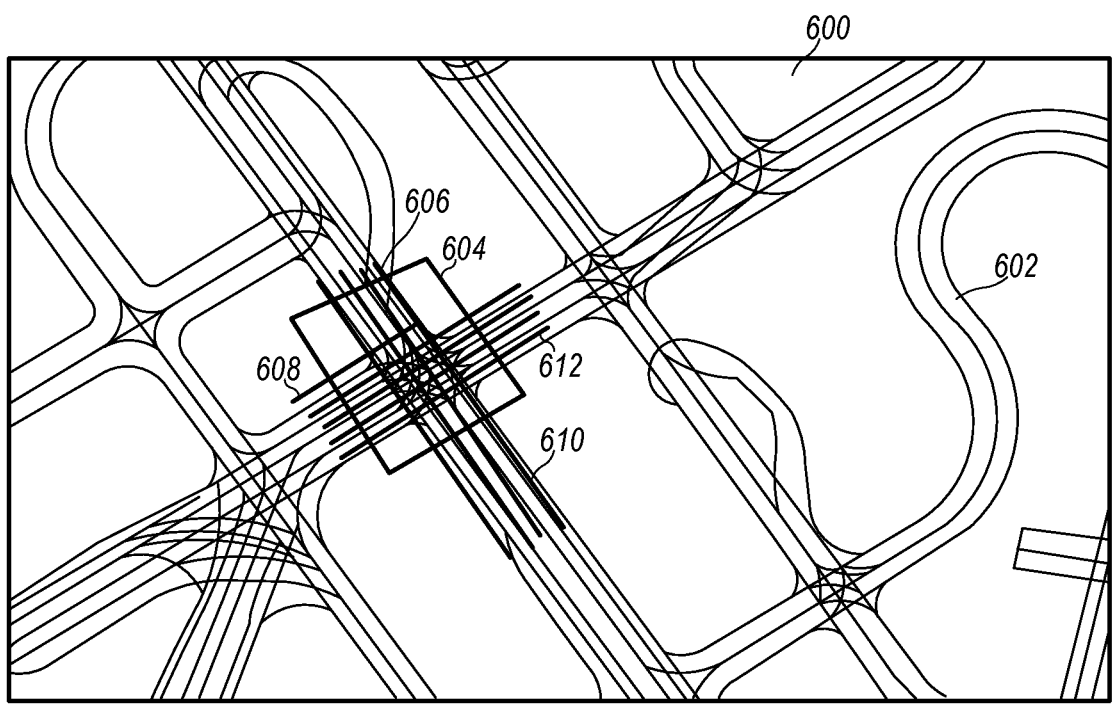
FIG. 7 depicts a fourth example aspect of map data including example constraint data generated within the example geographic location of FIG. 6 according to example embodiments of the present disclosure.

FIGS. 6-7 depict additional aspects of map data including example constraint data generated within an example geographic location according to example embodiments of the present disclosure. More particularly, FIG. 6 graphically depicts a portion of map data 600 that includes a plurality of travel way portions 602 along which an autonomous vehicle can be controlled to navigate within the particular geographic location represented by map data 600. Travel way portions 602 can include a combination of different travel way portions (e.g., lane segments, road segments, etc.) that are included within the displayed portion of map data 600.

FIG. 7 depicts the same map data 600 provided in FIG. 6 along with additional constraint data in the form of a polygon 604. In this particular example, polygon 604 has a first application type corresponding to an "exclusion" type and a second application type corresponding to a "partial" type. In other words, polygon 604 is a partial exclusion polygon 604, and has a predetermined boundary that encompasses a geographic area within a portion of the map data 600. Although exclusion polygon 604 is shown to include four vertices and four edges, the boundary of an exclusion polygon or other polygon can include any number of vertices and edges in a variety of configurations and can sometimes be shaped relative to the locations of nearby travel way portions.

When the map data 600 of FIG. 7 is evaluated relative to the constraint data (e.g., partial exclusion polygon 604), permitted and/or forbidden travel way portions can be determined. In this particular example, assuming that polygon 604 was received in a constraint file having a default "permit" state, all travel way portions should be permitted except for those travel way portions that are either completely enclosed or partially touched by exclusion polygon 604. Because travel way portions 606, 608, 610 and 612 in FIG. 7 are either completely enclosed or partially touched by exclusion polygon 604, travel way portions 606-612 are determined to be forbidden travel way portions. When an autonomous vehicle initially determines a travel route or updates a previously determined travel route based on the constraint data of FIG. 7, travel routes that include travel way portions 606-612 will be forbidden.

Figure 8:
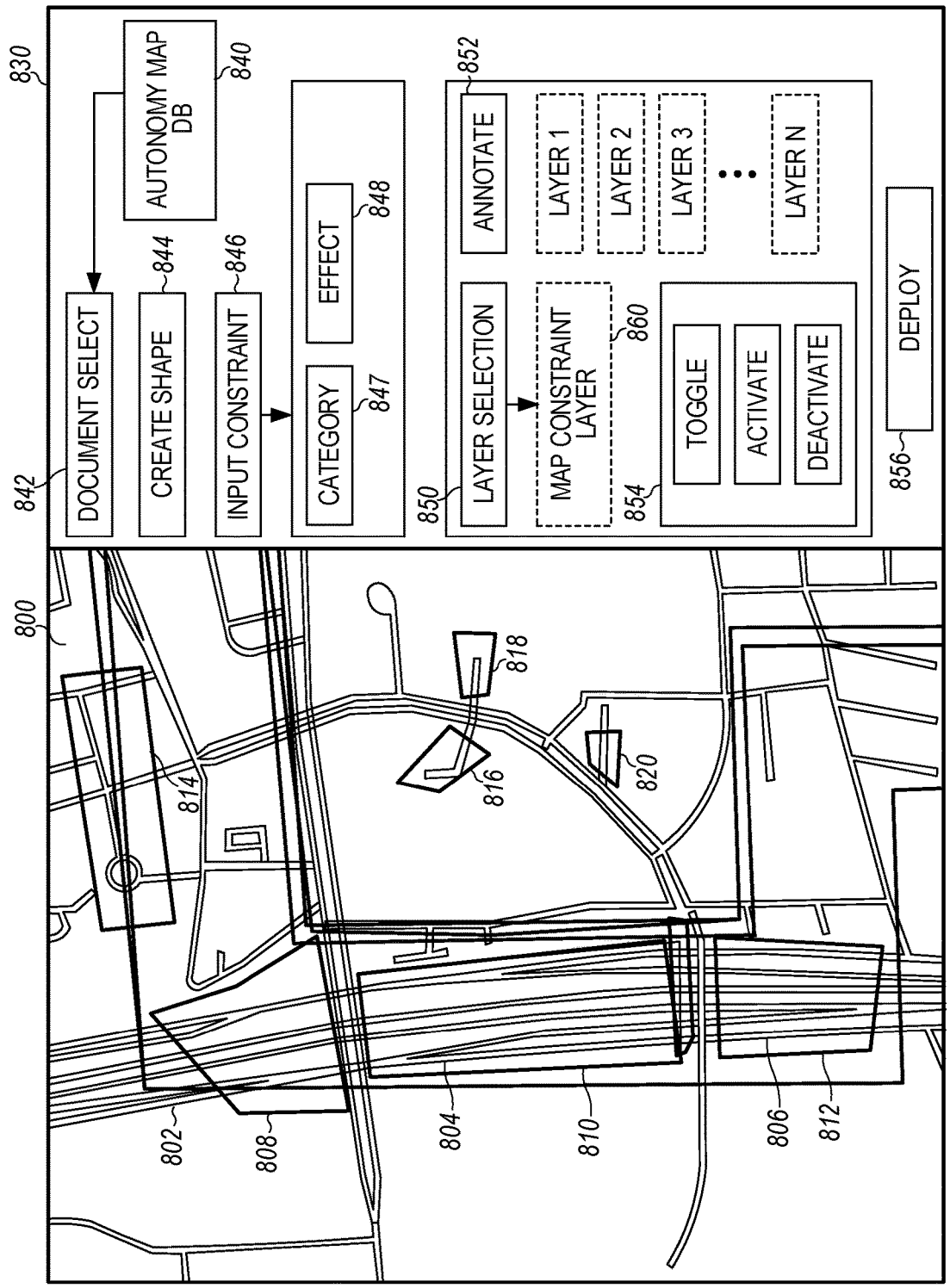
FIG. 8 depicts a fifth example aspect of map data including example constraint data and a constraint data user interface according to example embodiments of the present disclosure.

FIG. 8 depicts another example of map data and constraint data, particularly illustrating example exclusion polygons that may be created using the disclosed systems and methods to prevent an autonomous vehicle from using travel way portions that lead to or through a bridge within a particular geographic area. An example of this nature could arise, for instance, during planned construction that causes a bridge to be closed for an extended period of time or during an accident that temporarily affects navigation over such a bridge. FIG. 8 depicts map data 800 that includes travel way portions 802, 804, and 806 along a bridge. Exclusion polygons 808, 810, and 812 can be created to exclude respective travel way portions 802, 804, and 806 from permissible travel way portions for the determined travel routes of one or more autonomous vehicles. Additional exclusion polygons 814, 816, 818 and 820 can be created to exclude additional travel way portions, for example, travel way portions that directly or indirectly lead to the travel way portions 802-806 along the bridge.

FIG. 8 further depicts an example map constraint interface 830 based on a unified document model, according to examples described herein. The map constraint interface 830 can include an autonomy map document selection feature 840 that enables the fleet operator to select an autonomy map document at 842 from an autonomy map database. The selected autonomy map document 800 can be displayed once selected, and the fleet operator can interact with various features of the map constraint interface 830 to create a shape at 844 and configure an input constraint for the shape at 846 (e.g., utilizing a category 847 and effect 848 manifest). In the example shown, the fleet operator can configure shapes (e.g., shapes 808, 810, 812, 814, 816, 818, 820) encompassing respective route segments of roads (e.g., roads 802, 804, 806, etc.), and select particular map constraints (e.g., effects including, e.g., depart constraints) to be applied to each route segment encompassed by a particular shape.

In addition, the map constraint interface 830 can also enable the fleet operator to edit or append existing shapes on the autonomy map document 800. For example, the map constraint interface 830 can enable the operator to select a particular map constraint layer at 850, provide annotations at 852, toggle the layer to activate or deactivate the map constraint layer at 854, and/or deploy the updated autonomy map document to selected AVs at 856.

As an example, a route portion of the autonomy map document may be overlaid with multiple map constraint layers 860. In the navigational constraint category, the route portion may be overlaid with a forbidden routing constraint layer and an autonomy mode routing constraint layer. To prevent conflicting layers, the layers can be configured in accordance with a subsumption order (e.g., either manually configured by the fleet operator or automatically applied). The subsumption order comprises a hierarchy to which the AV is to treat the multiple layers. For example, the forbidden routing constraint layer, when activated, can override all lower order subsumption layers in the navigational constraint category for the particular route portion.

As described herein, a unified document model enables the fleet operator to use the map constraint interface 830 to apply any number of map constraint layers 860, in any shape, to a particular autonomy map document. Furthermore, each map constraint layer 860 can readily be activated or deactivated using the toggle feature 854 on the map constraint interface 830. Thus, for a given autonomy map document, the fleet operator can configure route portions on the autonomy map document to be layered with various map constraints of different categories (e.g., navigational constraints, perception constraints, prediction constraints, etc.), each toggled as activated or deactivated at 854.

In various examples, the fleet operator may also provide targeted annotations readable by the AV control system, which can provide the AV with contextual information that can affect one or more of the sequential AV operations (e.g., perception, prediction, or motion planning). For example, the fleet operator can provide annotations indicating a blind driveway or a pothole for the perception operations of the AV. As another example, the fleet operator can provide annotations indicating a frequent deer crossing for both perception and prediction operations of the AV. In certain implementations, the map constraint interface 830 can further enable the fleet operator to select AVs to which the autonomy map document is to be sent.

In accordance with embodiments described herein, the unified document model can comprise a series of autonomy map documents readily editable by the fleet operator in the manner described herein. Thus, the fleet operator can access any autonomy map document and, for example, toggle (activate or deactivate) existing map constraint layers at 854, create new map constraint layers at 840-848, and provide annotations at 852 for any route portion of the autonomy grid map. For example, if a construction project is scheduled for a certain route segment, the fleet operator can access the corresponding autonomy map document via the map constraint interface 830 and append an annotation to the document indicating the construction zone, and/or activate a particular navigational constraint to either forbid the AV from entering the construction zone, or cause the AV to be routed around it.

Once a set of autonomy map documents is finalized, the fleet operator can select a finalization or deploy feature 856 on the map constraint interface 830. The computer system can respond to deployment selection by flattening or compressing the map constraint layers of each document into a document image and compile the document images representing each autonomy map document into a document container. The document container may then be transmitted over-the-air to the selected AVs 102. The selected AVs 102 then can merge the document images of each autonomy map document into the corresponding existing autonomy map.

Accordingly, using the computer system and unified document model architecture described herein, the existing policy can be updated without the need for providing an entirely new autonomy map release.

In certain implementations, the map constraint interface 830 may also provide a policy mask feature that enables the fleet operator to override an entire existing policy utilized by the AVs. For example, an AV 102 may operate in accordance with an existing policy using an autonomy map for a current route segment. The existing policy can comprise a set of labels and or rules (e.g., initial map constraints) that the AV 102 must abide by when traversing the current route segment. The map constraint interface 830 can provide a policy mask feature that causes the entire policy to be overridden in favor of an updated policy (or a new set of map constraints).

The unified document model can be managed by a computer system that comprises a communication interface communicating, over one or more networks, with AVs that utilize autonomy maps to navigate throughout a given region. The computer system can generate the map constraint interface enabling the fleet operator to update map constraints for the AVs. In doing so, the computer system can receive, via the map constraint interface 830, a set of inputs configuring a set of constraint layers of one or more autonomy map documents corresponding to one or more autonomy maps 800. The computer system may then compile the autonomy map documents comprising a set of updated map constraints corresponding to the configured set of constraint layers into a document container and output the document container to a subset of AVs to enable the subset of AVs to integrate the set of updated map constraints with the existing autonomy maps.

The computer system can also tabulate, in metadata of a given autonomy map document, a set of lane identifiers such as entry point identifiers and exit point identifiers of selected route portions to which a given set of map constraints apply. In further examples, the computer system can generate metadata for the document indicating a creation time for the document, a number of constraint layers created, a number of constraints created, a number of shapes created, and/or the last time the document was modified and deployed to AVs. Along these lines, the computer system can manage a set of audit logs for tracking the history of map constraint updates based on the generated metadata of each autonomy map document.

In certain implementations, the AV 102 can communicate a constraint management state to the computer system, indicating the operational constraints currently applied by the AV control system. For example, when the AV 102 starts up, the AV 102 can transmit an initial communication of the constraint management state of the AV 102 to the computer system, which can determine whether the AV 102 has applied the current autonomy map updates. If not, then the computer system can transmit a document container comprising the updated autonomy map document images to the AV 102 for integration into the existing autonomy maps.

In some examples, the map data 600 and 800 of FIGS. 6-8 and associated constraint data can be generated using a software application and corresponding graphical user interfaces provided on a remote computing device such as remote computing device(s) 150 of FIG. 2. For example, specific portions of map data (e.g., map data 600, 800) can be identified by providing a specific address, landmark, latitude and longitude or other geographic identifier in a search interface feature within a graphical user interface. Map data then can be retrieved from a maps database corresponding to a geographic area surrounding the geographic identifier. In some examples, map data can be retrieved that corresponds with the same map data locally available at particular autonomous vehicles or fleets of autonomous vehicles.

Polygons (e.g., exclusion polygons 604, 808-820) or other constraint data can be drawn within a graphical user interface containing map data (e.g., map data 600, 800) using a drawing tool feature. For instance, a user can provide input to select the location of the vertices of each polygon using, for example, mouse clicks, keyboard entry or other input device selection. Polygon edges between the identified vertices can then be formed automatically by the drawing tool feature. The polygons or other constraint data can be defined in terms of global map coordinates that translate to similar global map coordinates provided within map data corresponding to a same geographic location or area. In some implementations, one or more polygons or other constraint data can be saved as one or more separate constraint files for selectively uploading and applying to one or more autonomous vehicles, fleets of vehicles, and/or geographic districts.

FIGS. 6-8 make use of geographic identifiers in the form of polygons having application types in the form of an exclusion type. It should be appreciated that constraint data can be provided in a variety of additional or alternative suitable formats. For example, geographic identifiers can include, for example, one or more polygons encompassing a geographic area, one or more travel way identifiers indicative of at least a portion of one or more lanes within a particular travel way, or other identifiers. In some implementations, the application type associated each geographic identifier can be selected from a predetermined group of application types (e.g., complete inclusion, partial inclusion, complete exclusion, partial exclusion, etc.). In another example, the application type can be selected as a value from within a range of possible application type values (e.g., a number selected from within a range of 0-10 with 0 being least permissible and 10 being most permissible). In another example, an application type can correspond to an associated cost factor for navigating in a particular geographic area.

FIGS. 9-10 depict example user interfaces 940 and 980 for applying constraint data according to example embodiments of the present disclosure. In some examples, user interfaces 940, 980 or others can be provided as part of a software application provided on a remote computing device such as remote computing device(s) 150 of FIG. 2. In some examples, the software application providing graphical user interfaces 940 and 980 can also provide graphical user interfaces for displaying and creating the map data and constraint data depicted in FIGS. 6-8.

FIG. 9 illustrates graphical user interface 940 that can afford a computing device user the ability to perform a variety of functions. For instance, graphical user interface 940 can include an interface portion 941 that can be used to view all constraint data (e.g., identified by specific constraint files) created by a software application, independent of which constraint data is applied to a particular vehicle or fleet of vehicles. Interface portion 942 can include one or more districts that correspond to the area including each particular constraint file identified in interface portion 941, while interface portion 943 can include an optional additional description describing what each constraint file identified in interface portion 941 represents. For each constraint file identified in interface portion 941, an additional interface portion 944 can identify one or more vehicles to which each constraint file is attached, as well as when the constraint file was added, who added the constraint file to the software application, and whether the constraint file is currently applied. One or more selectable interface elements 945 can be provided to delete existing constraint files. One or more selectable interface elements 946 and/or 947 can be provided to upload new constraint files. One or more selectable interface elements 948 can be provided to apply selected constraint files to particular vehicles(s), fleet(s) and/or district(s).

In sample embodiments, the constraint files are used to implement constraints over the map of an autonomous vehicle by producing sets of forbidden lanes or high cost lanes to limit vehicle operation areas. The constraint files are composed primarily of polygons with global geographic coordinates (e.g., using UTM) defining which regions are permitted for routing and which regions are forbidden for routing. Evaluating the constraints to decide whether a lane is permitted or forbidden requires loading lane geometry from the map and comparing against multiple polygons from the constraints file. In sample embodiments, a vehicle command geosearch index may be used to significantly speed up constraints evaluation against the constraint polygons. All types of constraints described herein may be evaluated using the same evaluation patterns. For example, the algorithm may evaluate all lanes in an autonomous vehicle map entry point and a set of constraints polygons. Then, for each lane in the autonomous vehicle map and for each polygon in the constraint definition, the algorithm checks if the lane geometry overlaps with the polygon. If yes, this is a forbidden lane. However, as the autonomous vehicle map gets larger and larger, this implementation is not very efficient. Constraint evaluation ideally happens in real-time on the autonomous vehicles, and poor performance would have a bad impact on autonomous vehicle operations.

The constraints evaluation may be significantly sped up using a vehicle command geosearch index library. In a sample embodiment, two levels of evaluation (submap and lane levels) are applied. A submap is evaluated against a constraint polygon. If the submap and polygon is disjoint, then there is no need to go to lane level evaluation. This polygon has no effect on all lanes within this submap. Also, if the submap is fully contained within the polygon, then there is no need to go to lane level evaluation. All lanes within this submap are forbidden. Otherwise lane level evaluation is performed whereby for every lane in the submap the lanes are checked against the polygon. Given a constraints polygon, the query geosearch index is used to obtain a list of potential submaps for the first level evaluation.

In some implementations, user selection of an interface element such as interface elements 945-948 can initiate the display of additional or alternative graphical user interfaces. For example, selecting a particular constraint file followed by selection of interface element 948 in graphical user interface 940 of FIG. 9 can initiate the display of an additional graphical user interface 980 as depicted in FIG. 10. Graphical user interface 980 can include one or more selectable interface elements for identifying particular application targets for a given constraint file. For instance, user selection of interface element 982 can be used to apply selected constraint files to one or more particular vehicles as identified in drop down menu 988. User selection of interface element 984 can be used to apply selected constraint files to one or more particular fleets of vehicles, also as identified using drop down menu 988. User selection of interface element 986 can be used to apply selected constraint files to one or more particular districts using, for example, drop down menu 988. Once a constraint file is selected for application using graphical user interfaces 940 and/or 980, such constraint files can be transmitted to one or more autonomous vehicles 102 over a network (e.g., network 180 of FIG. 2). Once received by an autonomous vehicle 102, the constraint files can be manually or automatically accepted by the autonomous vehicle and used to determine new and/or updated travel routes.

Figure 11:
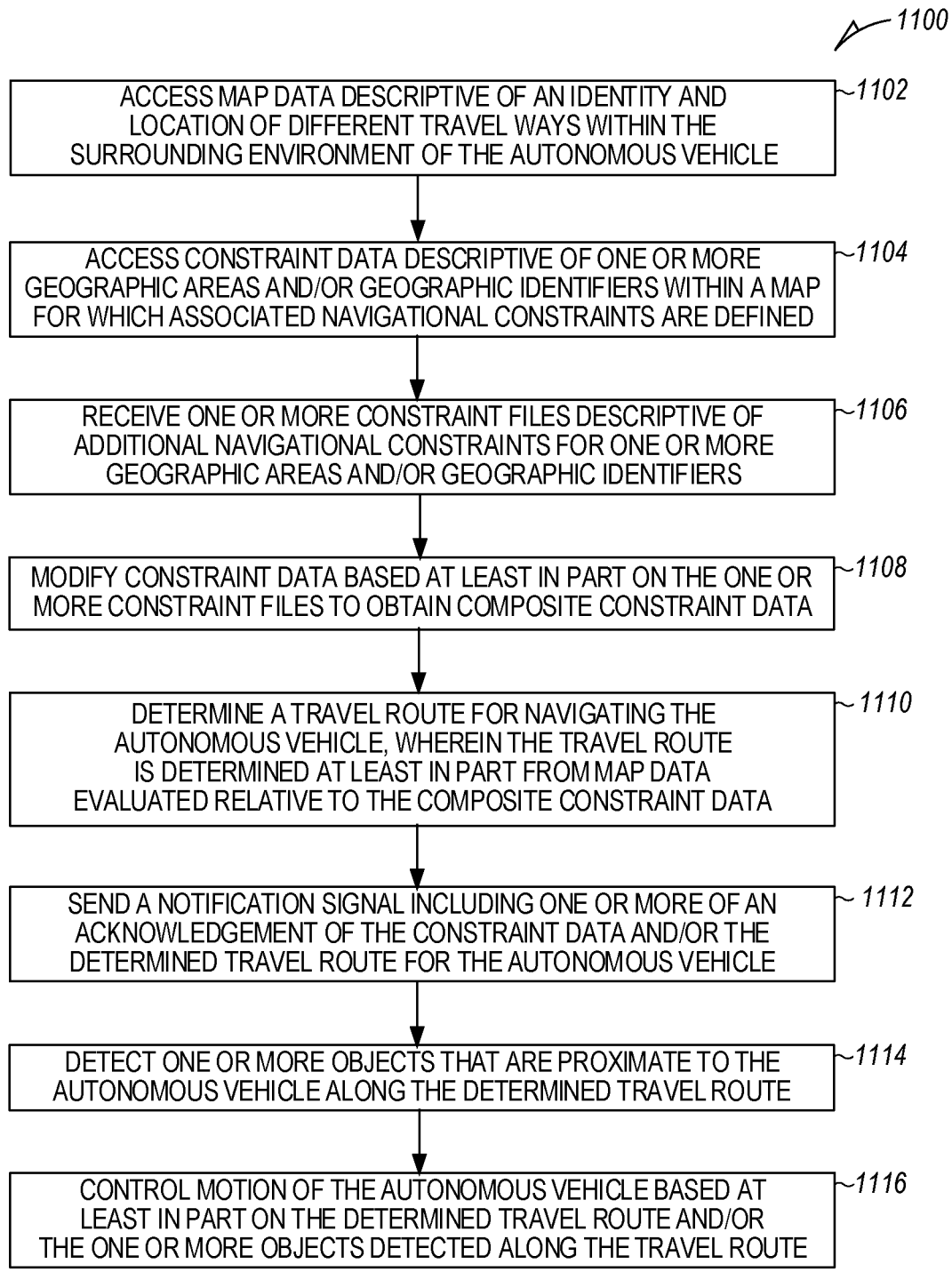
FIG. 11 depicts an example flow chart of a first example method of controlling navigation of an autonomous vehicle according to example embodiments of the present disclosure.

FIG. 11 depicts an example flow chart of a first example method 1100 of controlling navigation of an autonomous vehicle 102 according to example embodiments of the present disclosure. One or more portion(s) of the method 1100 can be implemented by one or more computing devices such as, for example, the computing device(s) 106 of FIG. 1. Moreover, one or more portion(s) of the method 1100 can be implemented as an algorithm on the hardware components of the device(s) described herein (e.g., as in FIGS. 1 and 2) to, for example, control the motion of an autonomous vehicle 102. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The method 1100 can include accessing, retrieving, or otherwise obtaining map data descriptive of an identity and location of different travel ways within the surrounding environment of the autonomous vehicle at 1102. The map data accessed at 1102 can include at least a portion of map data 118 described in FIGS. 1-2. The map data accessed at 1102 can provide information regarding the identity and location of different travel ways (e.g., roads, road segments, lanes, lane segments, parking lanes, turning lanes, bicycle lanes, or other portions of a particular travel way). In some examples, travel way portions within map data accessed at 1102 can include one or more descriptors including, for example, a district identifier for a map coverage area containing the travel way portion, a travel way portion identifier, a start point for the travel way portion, an end point for the travel way portion, a directionality (e.g., direction of traffic flow), and/or connectivity identifiers for other travel way portions that are predecessors and/or successors to a given travel way portion. Map data accessed at 1102 can also include the identity and location of different items than travel ways, including but not limited to buildings, maintenance/service locations for the autonomous vehicles, parking areas, traffic signs, traffic lights, traffic control devices, and/or any other map data that provides information that assists the computing system in comprehending and perceiving its surrounding environment and its relationship thereto.

Method 1100 also can include accessing, retrieving, or otherwise obtaining constraint data descriptive of one or more geographic areas and/or geographic identifiers within a map at 1104 (e.g., map data accessed at 1102) for which associated navigational constraints are defined. The constraint data accessed at 1104 can include at least a portion of constraint data 120 described in FIGS. 1-2. Constraint data accessed at 1104 can include different forms of information describing navigational constraints. For example, constraint data can include a priori map constraints identifying particular travel way portions from which an autonomous vehicle 102 should be excluded or have a reduced likelihood of operation. For instance, constraint data accessed at 1104 can prevent or reduce the likelihood of an autonomous vehicle 102 making a left hand turn in particular turn lanes of a given travel way or travel way portion when a vehicle is operating in a particular mode (e.g., fully autonomous mode).

In some implementations, constraint data accessed at 1104 can include one or more portions of base constraint data applied to a particular autonomous vehicle. In some implementations, the portions of base constraint data selected for application to a particular vehicle can depend at least in part on factors such as the operation location, operating mode, or other factors associated with each autonomous vehicle. Different operating modes can include, for example, a fully autonomous mode in which an autonomous vehicle 102 operates without a human driver present in the vehicle, an autonomous mode in which the autonomous vehicle operates with a human driver in the vehicle, or other modes. Different operating modes can additionally or alternatively include, for example, whether a vehicle is currently engaged (e.g., on-task) or not engaged (e.g., off-task) in performing a service. For instance, some vehicles may currently have passengers on board that are being driven from one location to another, while other vehicles may be engaged in controlled navigation but not currently engaged in a particular operational task.

The method 1100 can further include receiving one or more constraint files descriptive of additional navigational constraints for one or more geographic areas and/or geographic identifiers at 1106. In some implementations, the one or more constraint files received at 1106 can be received from one or more remote computing devices that are remote from the autonomous vehicle and that are configured to control operation of a fleet of autonomous vehicles. The one or more constraint files can be generated by the one or more remote computing devices, for example, in response to identification of an event at some geographic location that will impact navigation at such location (e.g., a street fair, sporting event, traffic accident, parade, etc.) at a present and/or future time.

Each constraint file received at 1106 can include a constraint set including zero or more geographic identifiers (e.g., polygons having boundaries defined relative to a geographic area and having an associated application type) as well as a default state (e.g., permit, forbid) indicating whether to by default permit or forbid areas described by the constraint file. Each geographic identifier described by the constraint file(s) received at 1106 can be provided in a variety of suitable formats. Geographic identifiers can include, for example, one or more polygons encompassing a geographic area, one or more travel way identifiers indicative of at least a portion of one or more lanes within a particular travel way, or other identifiers. Application types associated with each geographic identifier provided within the constraint file(s) received at 1106 can also be provided in a variety of suitable formats. For example, the application type associated with each geographic identifier can be selected from a predetermined group of first application types (e.g., inclusion, exclusion, etc.). In another example, the application type associated with each geographic identifier can be selected from a predetermined group of second application types (e.g., partial, complete, etc.) In another example, the application type can be selected as a value from within a range of possible application type values (e.g., a number selected from within a range of 0-10 with 0 being least permissible or preferred and 10 being most permissible or preferred). In another example, an application type can correspond to an associated cost factor for navigating in a particular geographic area.

Method 1100 can further include generating composite constraint data at 1108. Generating composite constraint data at 1108 can include modifying the constraint data accessed at 1104 based at least in part on the one or more constraint files received at 1106. Constraint data included within the one or more constraint files received at 1106 can either append or revise existing constraint data. In some examples, existing constraint data includes base constraint data determined for a particular vehicle. In some examples, existing constraint data includes base constraint data as well as constraint data received in one or more previously received constraint files. In such instances, constraint files received at 1106 can sometimes completely overwrite previously received constraint files such that modifying constraint data at 1108 includes removing previously received constraint files and adding newly received constraint files. In some examples, constraint files received at 1106 are added to and/or combined with previously received constraint files when modifying constraint data at 1108.

In some implementations, the constraint data accessed at 1104 can include one or more inviolate constraints. Inviolate constraints can include those constraints that should not be changed or overwritten due to a level of importance in their application during autonomous navigation. In such instances, modifying constraint data at 1108 can include adding to or revising the constraint data accessed at 1104 in a manner that does not conflict with inviolate constraints within the constraint data. The modification of constraint data at 1108 can be implemented such that composite constraint data always includes any inviolate constraints. In other words, modification of constraint data at 1108 should not remove any constraints from the constraint data accessed at 1104 that are identified as inviolate constraints.

The method 1100 can further include determining a travel route for navigating the autonomous vehicle 102 at 1110. The travel route determined at 1110 can be determined at least in part from map data accessed at 1102 evaluated relative to the composite constraint data generated at 1108. For example, the map data accessed at 1102 can be evaluated in association with the composite constraint data generated at 1108 to determine which travel way portions are permitted and/or which travel way portions are forbidden from possible navigable travel ways within a set of map data. In some examples, a travel route can be determined at 1110 that does not include a forbidden travel way portion.

In some examples, a travel route can be determined at 1110 that gives preference to travel way portions having an application type associated with a lower cost factor. When constraint data includes application types associated with cost factors, one or more computing devices associated with an autonomous vehicle 102 can determine a travel route at 1110 that minimizes a total cost based at least in part on cost factors associated with application types included as part of constraint data 120 as well as optional additional cost factors, cost functions or the like for other navigational objectives. Depending on the manner of application type, travel routes can be determined at 1110 that not only can exclude particular areas from navigation but that additionally or alternatively can reduce traffic in particular areas based at least in part on evaluation of the constraint data.

A travel route determined at 1110 can include, for example, a sequence of multiple travel way portions along which an autonomous vehicle can navigate, for example, to accomplish a predetermined navigational objective. Each travel way portion within a determined travel route can be defined by one or more of a travel way identifier, a start point, an end point, directionality, and/or connectivity identifiers for predecessor and/or successor travel way portions.

In some examples, travel routes determined at 1110 can be determined in accordance with a navigational objective (e.g., traveling to a destination location to perform a service such as rideshare service, delivery service, courier service, etc.). In some examples, travel routes determined at 1110 can be determined to accomplish the navigational objective using travel way portions that are permitted and/or preferred as opposed to forbidden and/or not preferred based on map data evaluated in association with constraint data. In some implementations, for example, it may be desirable to forbid or not prefer specific areas or specific travel ways within an area due to events such as a traffic accident, street fair, construction, a parade, or the like. In other implementations, for example, it may be desirable to permit or prefer specific areas or specific travel ways within an area for navigation by particular autonomous vehicles that are assigned to perform services in a given area, thus affording efficient distribution of fleet resources.

The method 1100 can further include sending a notification signal at 1112. In some examples notification signals sent at 1112 can be sent from a vehicle computing device 106 as depicted in FIGS. 1 and 2. In some examples, notification signals sent at 1112 can be sent to one or more remote computing devices 150 as depicted in FIG. 2. In some examples, notification signals sent at 1112 can be sent over a network 180 as depicted in FIG. 2. In some implementations, a notification signal sent at 1112 can include one or more of an acknowledgement of receipt of the one or more constraint files received at 1106 and/or a confirmation of modification of constraint data at 1108. In some implementations, a notification signal sent at 1112 can additionally or alternatively include the travel route determined at 1110.

The method 1100 can include detecting one or more objects that are proximate to the autonomous vehicle 102 at 1114 as it navigates along the travel route determined at 1110. Detection of objects at 1114 can be implemented by analyzing sensor data obtained from one or more sensors (e.g., image capture devices, RADAR devices, LIDAR devices, etc.) 104 depicted in FIG. 1. The perception system 110 of FIG. 1 can detect object(s) including, for example, pedestrians, other vehicles, bicycles, barriers, boundaries, traffic control devices, etc. The sensor data can be indicative of locations associated with the object(s) within the surrounding environment of the autonomous vehicle at one or more time(s). Perception system 110 can further analyze the sensor data to detect certain objects as objects of interest from background or other objects.

The method 1100 can include controlling motion of the autonomous vehicle at 1116 based at least in part on the travel route determined at 1110 and/or the one or more objects detected along the travel route at 1114. Motion of an autonomous vehicle 102 can be controlled at 1116 by determining a motion plan relative to the travel route. The motion plan can be configured to generally follow the travel route while concurrently planning to navigate appropriately relative to any detected objects proximate to the autonomous vehicle (e.g., pedestrians, other vehicles, traffic control devices, etc.) that are detected by the vehicle's sensors.

In some implementations, controlling motion of a vehicle at 1116 can be done in accordance with an optimization algorithm that considers cost factors associated with the constraint data (e.g., application types having associated cost factors) as well as other cost factors or functions (e.g., based on speed limits, traffic lights, etc.), if any, to determine optimized variables that make up a motion plan. By way of example, motion of a vehicle can be controlled in a manner that accomplishes a navigational objective using permitted travel way portions from a travel route determined at 1110 without increasing the potential risk to the vehicle 102 and/or violating any traffic laws (e.g., speed limits, lane boundaries, signage).

Controlling motion of a vehicle at 1116 can include providing data indicative of a motion plan to a vehicle controller to implement the motion plan for the autonomous vehicle 102. For instance, an autonomous vehicle 102 can include a vehicle controller 116 as depicted in FIG. 1 that is configured to translate the motion plan into instructions. By way of example, the vehicle controller 116 can translate a determined motion plan into instructions to adjust the steering of the autonomous vehicle 102 "X" degrees, apply 10% braking force, modulate a speed of the autonomous vehicle 102, etc. The vehicle controller 116 can send one or more control signals to components of the vehicle controls 108 (e.g., braking control component, steering control component, speed/throttle control component) to execute the instructions and implement the motion plan.

Figure 12:
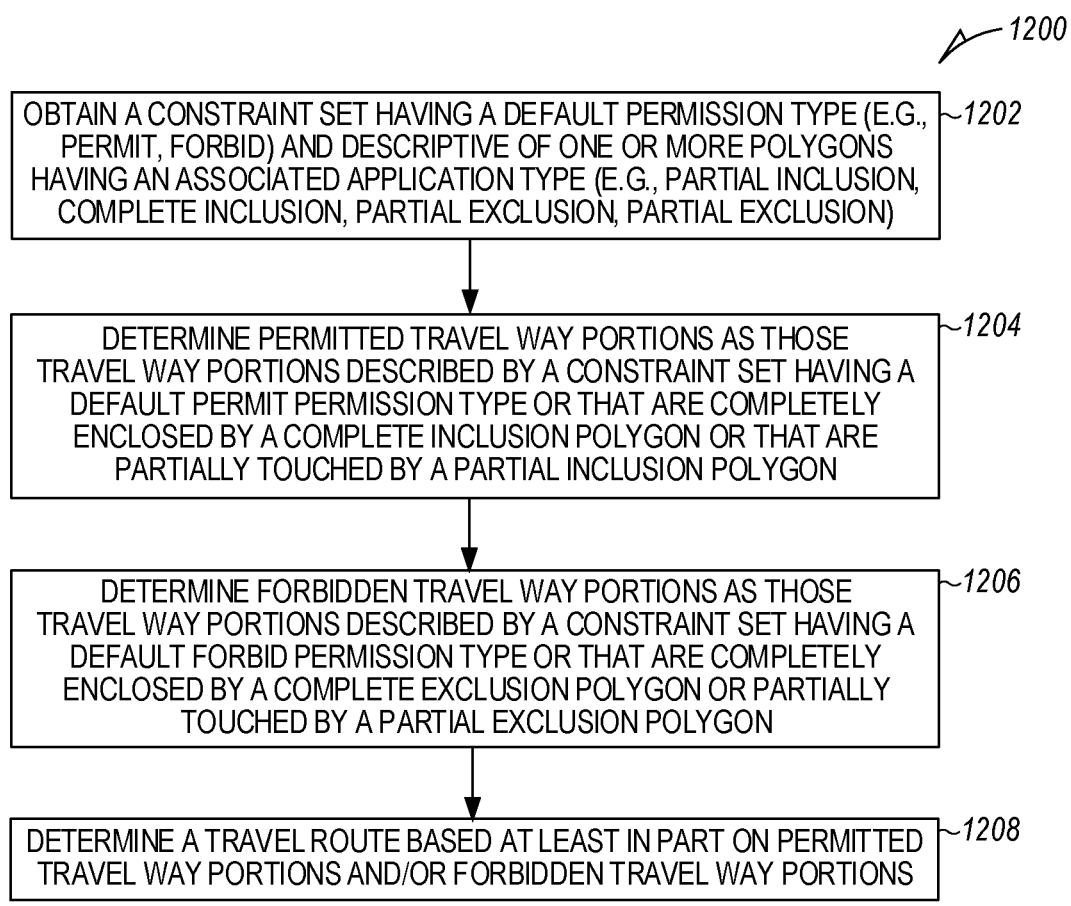
FIG. 12 depicts an example flow chart of a method of determining a travel route for an autonomous vehicle according to example embodiments of the present disclosure.

FIG. 12 depicts a flow chart of an example method 1200 of determining a travel route for an autonomous vehicle, such as referred to in 1110 of FIG. 11. One or more portion(s) of the method 1200 can be implemented by one or more computing devices such as, for example, the computing device(s) 106 of FIG. 1. Moreover, one or more portion (s) of the method 1200 can be implemented as an algorithm on the hardware components of the device(s) described herein (e.g., as in FIGS. 1 and 2) to, for example, control the motion of a vehicle. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

As illustrated at 1202, the method 1200 can include obtaining a constraint set having a default state (e.g., permit or forbid) and being descriptive of zero or more geographic identifiers (e.g., polygons) and associated application types (e.g., complete inclusion, complete exclusion, partial inclusion, partial exclusion). In a specific implementation, method 1200 can include obtaining at 1202 constraint data descriptive of one or more polygons having an associated application type. Each polygon can correspond, for example, to an inclusion polygon identifying an area for inclusion in a permissible area for navigation by an autonomous vehicle 102 and/or an exclusion polygon identifying an area for exclusion from a permissible area for navigation by an autonomous vehicle 102.

The method 1200 can further include at 1204 determining permitted travel way portions. For instance, permitted travel way portions can be determined as those travel way portions that are described by a constraint set having a default "permit" state, that are completely enclosed by a complete inclusion polygon, or that are completely enclosed or partially touched by a partial inclusion polygon.

The method 1200 can further include at 1206 determining forbidden travel way portions. For instance, forbidden travel way portions can be determined as those travel way portions that are described by a constraint set having a default "forbid" state, that are completely enclosed by a complete exclusion polygon, or that are completely enclosed or partially touched by a partial exclusion polygon. When a travel way portion is part of both an inclusion polygon and an exclusion polygon, such travel way portion should be excluded. In other words, determination as an excluded travel way portion can trump determination as an included travel way portion.

The method 1200 can further include at 1208 determining a travel route based at least in part on permitted travel way portions determined at 1204 and forbidden travel way portions determined at 1206. Determining a travel route at 1208 can be implemented, for example, by route determiner 122 of FIG. 1. Travel routes determined at 1208 can preferably consist of permitted travel way portions determined at 1204 without any of the forbidden travel way portions determined at 1206.

Figure 13:
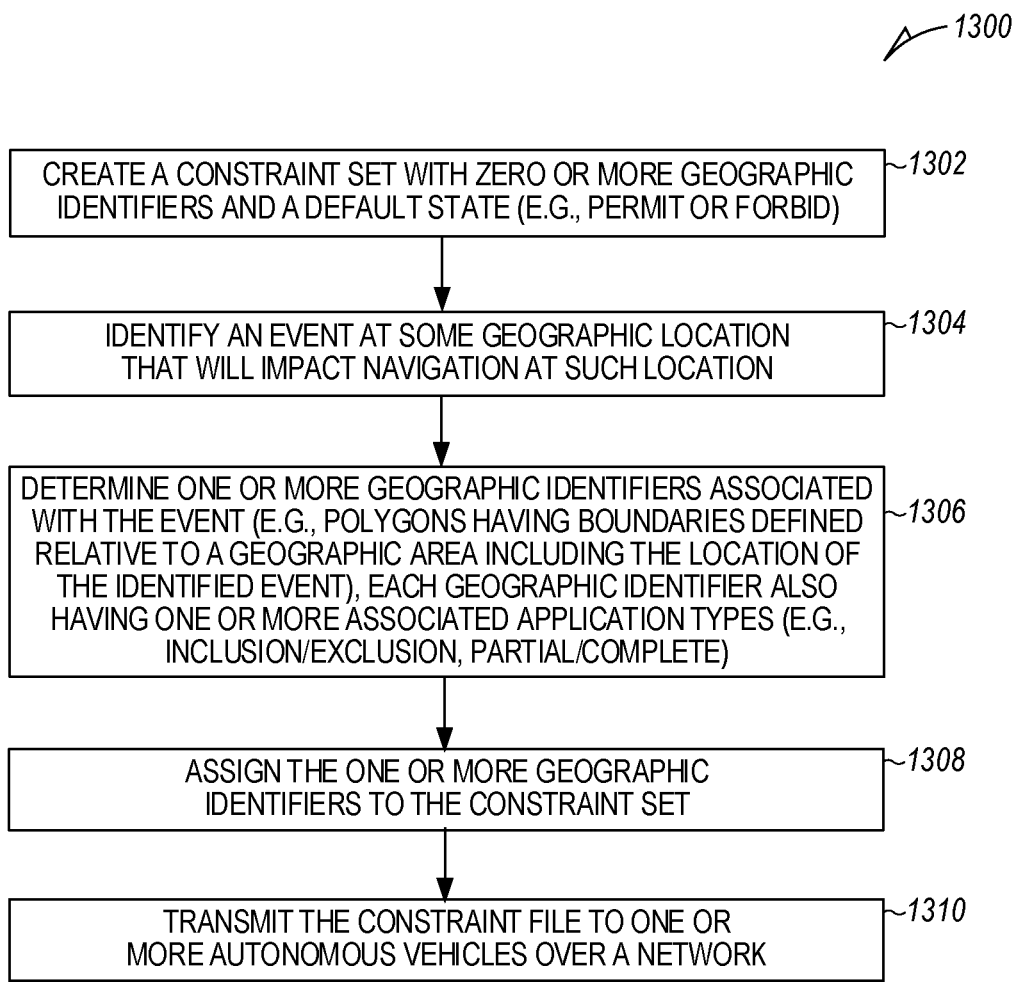
FIG. 13 depicts an example flow chart of a second example method of controlling navigation of an autonomous vehicle according to example embodiment of the present disclosure.

FIG. 13 depicts an example flow chart of a second example method 1300 of controlling navigation of an autonomous vehicle according to example embodiments of the present disclosure.

One or more portion(s) of the method 1300 can be implemented by one or more computing devices such as, for example, the remote computing device(s) 150 of FIG. 2. In some examples, such remote computing device(s) can be included as part of a central control system that is in wireless communication with a plurality of autonomous vehicles, such as a fleet of autonomous vehicles providing one or more services (rideshare service, delivery service, courier service, etc.).

Moreover, one or more portion(s) of the method 1300 can be implemented as an algorithm on the hardware components of the device(s) described herein (e.g., as in FIG. 2) to, for example, control the motion of a vehicle. FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

As illustrated at 1302, the method 1300 can include creating a constraint set with zero or more geographic identifiers and having a default state (e.g., permit or forbid). The default state can indicate whether to by default permit or forbid areas described by a constraint set and/or constraint file that includes the constraint set.

The method 1300 can further include at 1304 identifying an event at some geographic location that will impact navigation at such location (e.g., a street fair, sporting event, traffic accident, parade, etc.). Identification of one or more events at 1304, for which the disclosed constraint data can be determined, can come from data descriptive of an upcoming event (e.g., sporting event or the like) and/or historical data (e.g., by approximating navigational limitations based on past events in a particular geographic region at a certain time and/or date). Identification of one or more events at 1302 can be implemented using various databases to predict, approximate, and/or determine the events and/or geographic locations of anticipated navigational limitations. For example, for different geographic regions, event information (e.g., location, time, and/or date of the event, or the like) can be stored in an event database. Event information can be indicative of whether traffic can be higher or lower at a certain time period (e.g., a time period before the event begins versus a time period when the event is ongoing). In another example, event information can come from calendar databases that indicate important dates (e.g., holidays, first days of school for a city, voting day, or the like). Other examples of outside sources or other stored data (e.g., predicted future, current and/or historic events, conditions, or the like) include weather conditions, news information (e.g., fires, emergency situations, or the like), social information (e.g., via social networking websites), traffic conditions, flight information from airports and/or airlines, or the like, or other information that can assist in determining event information, traffic patterns or other data contributing to potential navigational constraints.

For each event identified at 1304, constraint data associated with the identified event can then be determined. For example, at 1306 the method 1300 can include determining one or more geographic identifiers associated with the event. For example, determining a geographic identifier at 1306 can include determining a polygon having a boundary defined relative to a geographic area including the location of the event. In some implementations, the polygon can have a boundary that encompasses a geographic area including the location of the identified event. Each geographic identifier determined at 1306 can also have an associated application type (e.g., inclusion, exclusion, complete, partial) for the geographic identifier (e.g., the polygon). In some examples, determining one or more geographic identifiers at 1306 can be implemented using a drawing tool feature such as described with reference to FIGS. 6-8.

The method 1300 can further include assigning at 1308 the one or more geographic identifiers to the constraint set created at 1302.

A constraint file including the constraint set then can be transmitted at 1310 to one or more autonomous vehicles 102 over a network (e.g., network 180 of FIG. 2). In some examples, transmitting constraint data at 1310 can be initiated using one or more graphical user interfaces, such as graphical user interfaces 940, 980 of FIGS. 9-10.

Figure 14:
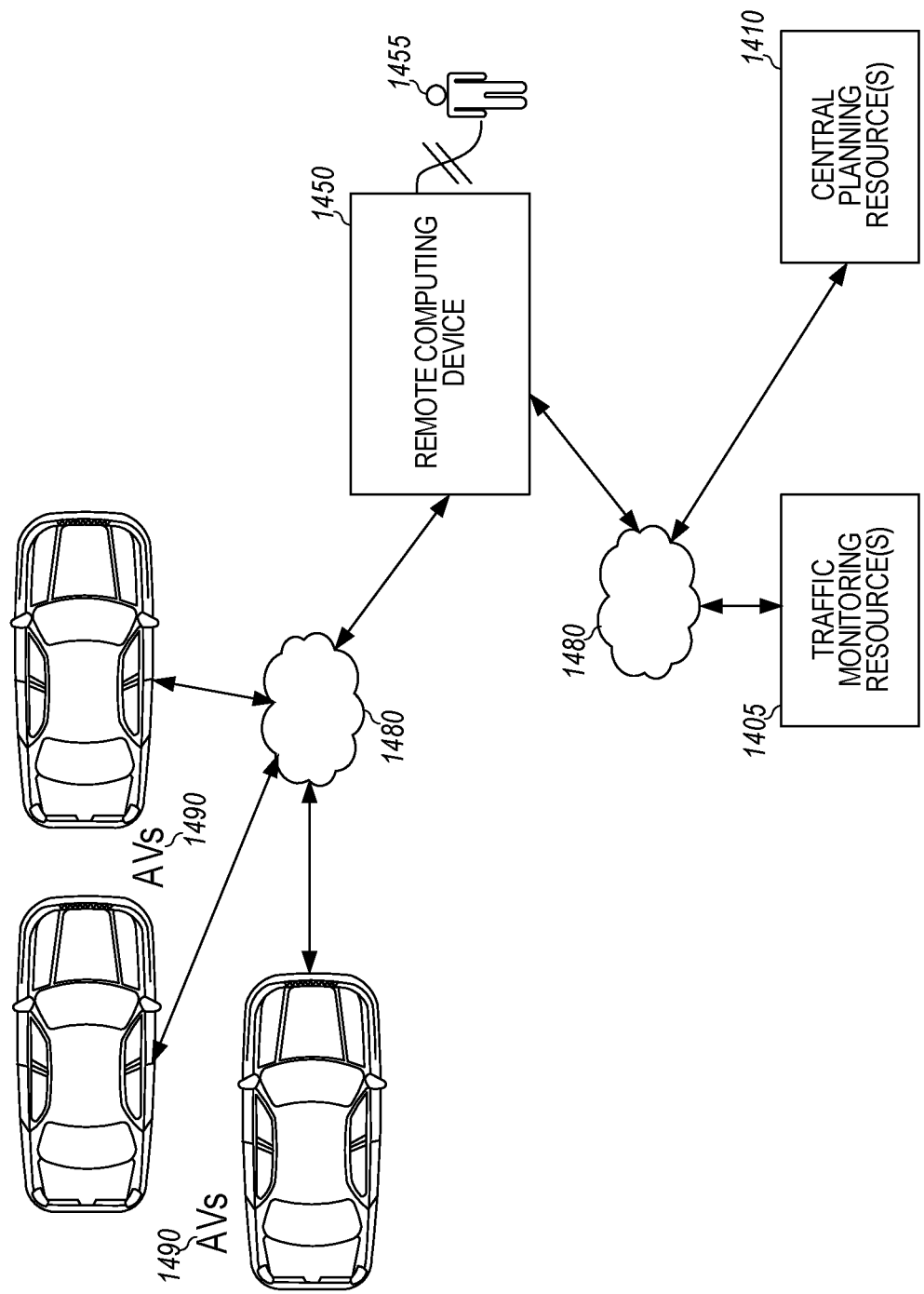
FIG. 14 depicts an example system for providing up-to-date route constraint information to autonomous vehicles according to example embodiments of the present disclosure.

FIG. 14 depicts an example system for providing up-to-date route constraint information to autonomous vehicles according to example embodiments of the present disclosure. In the below description of FIG. 14, the remote computing device 1450 can correspond to the remote computing device 150 as shown and described with respect to FIG. 2, and throughout the present disclosure. The remote computing device 1450 can communicate with a fleet of autonomous vehicles 1490 operating throughout a given region (e.g., a metropolitan area or predefined operational grid on a road network) over one or more networks 1480. The remote computing device 1450 can further communicate with one or more central planning resources 1410 and/or one or more traffic monitoring resources 1405 over one or more networks 1480.

As described herein, the traffic monitoring resources 1405 can monitor live traffic conditions for the given region and identify lane or road segments that are currently jammed with traffic, blocked, or otherwise inaccessible. The traffic monitoring resources 1405 can be crowd-sourced or updated by users of a live traffic mapping resource or application or can comprise a central monitoring service that continually updates traffic conditions on a granular level (e.g., every road segment of the given region). In some aspects, the traffic monitoring resources 1405 can indicate the source for a live traffic constraint, as well as the road or lane segment(s) affected. In doing so, the traffic monitoring resources 1405 can provide the remote computing device 1450 with contextual information for the live traffic constraint. For example, the traffic monitoring resources 1405 can classify the live traffic constraints in terms of type (e.g., normal traffic jam, vehicle incident, spontaneous or unplanned event), estimated time of resolution (e.g., less than ten minutes, between ten and thirty minute, or greater than thirty minutes), and/or size of the traffic constraint (e.g., whether multiple parallel road segments are constrained).

The central planning resources 1410 may be updated by central planning authorities based on planned road and/or lane closures for the given region. For example, the central planning resources 1410 can indicate permitted events requiring closure of a certain road segment during a certain time frame. Such permitted events can comprise parades, festivals, protests, road construction, utility servicing, and other planned events involving a road or lane closure.

In accordance with examples described herein, the remote computing device 1450 update the autonomy map constraints for the given region based on the planned lane or road closures indicated by the central planning resources 1410 and the live traffic constraints indicated by the traffic monitoring resources 1405. In certain examples, the remote computing device 1450 can be manually operated by an administrator 1455. For manual implementations, the administrator 1455 can manually access the traffic monitoring resources 1405 and/or central planning resources 1410 over one or more networks 1480 to determine any traffic or road segment constraints for the given region. The administrator 1455 may then manually update autonomy map constraints that dictate road and lane segments through which the autonomous vehicles 1490 may operate.

In variations, the autonomy map constraints may be automatically updated by the remote computing device 1450. For example, the remote computing device 1450 can periodically or continuously parse through any live traffic constraints and planned road or lane closures indicated by the traffic monitoring resources 1405 and central planning resources 1410 to update the autonomy map constraints for the autonomous vehicles 1490. For example, updating of the autonomy map constraints (automatically or manually) can correspond to establishing exclusion polygons for each of the traffic or road segment constraints identified by the traffic monitoring resources 1405 or the central planning resources 1410. The remote computing device 1450 may then transmit traffic flow constraint information identifying the closed road or segments to the autonomous vehicles 1490 over the network(s) 1480. For example, the remote computing device 1450 can generate a constraint file comprising the traffic flow constraint information indicating the excluded road segments, and transmit the constraint file to the autonomous vehicles 1490 over the network(s) 1480.

As described herein, the remote computing device 1450 can transmit the traffic flow constraint information to all autonomous vehicles 1490 or selectively. For example, the remote computing device 1450 can manage an on-demand transport service that routes the autonomous vehicles 1490 throughout the given region based on user demands (e.g., for freight delivery, food delivery, passenger transport, etc.). In such examples, the remote computing device 1450 can selectively transmit the traffic flow constraint information to only those autonomous vehicles 1490 that are routed to converge towards or intersect with the excluded road or lane segments.

Based on the traffic flow constraint information transmitted from the remote computing device 1450, the autonomous vehicles 1490 can perform route planning operations accordingly. For example, the remote computing device 1450 or other transportation coordination system can provide the autonomous vehicles 1490 with a sequence of destinations for making pick-ups and drop-offs. The on-board of off-board computing systems of the autonomous vehicles 1490 can generate respective route plans to autonomously drive to a next destination. Based on the constraint file(s), comprising the traffic flow constraint information, received from the remote computing device 1450, the autonomous vehicles 1490 can inherently avoid the exclusion zones or forbidden road segments. Accordingly, the remote computing device 1450 can leverage the live-traffic constraints and planned closures indicated by the traffic monitoring resources 1405 and central planning resources 1410 to create exclusion zones within the given region in which the autonomous vehicles 1490 operate. The remote computing device 1450 can then generate constraint files identifying the exclusion zones and transmit the constraint files to the autonomous vehicles.

Figure 15:
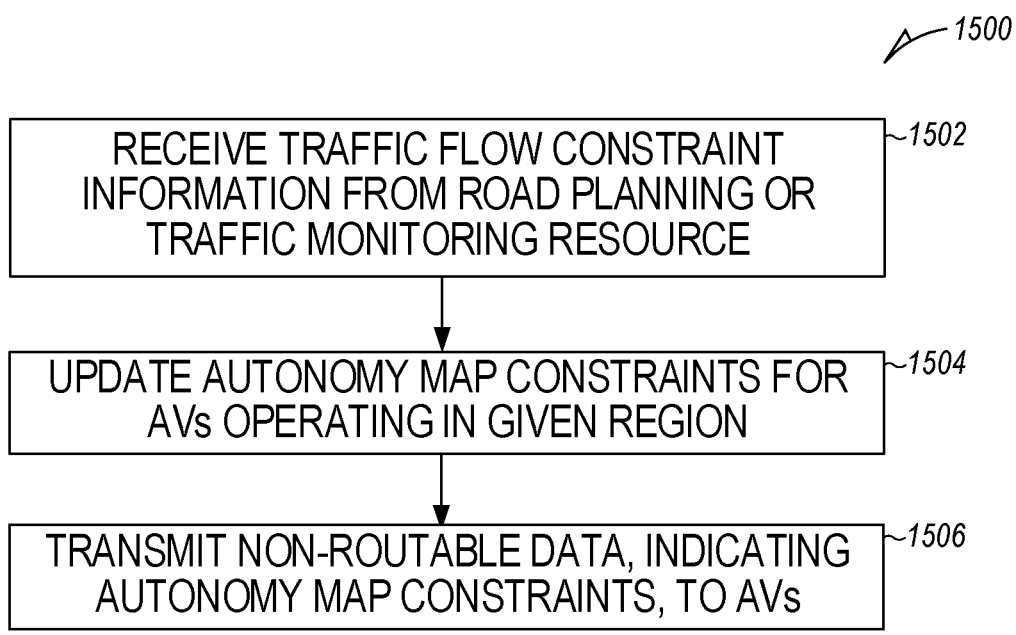
FIG. 15 depicts an example flow chart of a method of providing up-to-date route constraint information to autonomous vehicles according to example embodiments of the present disclosure.

FIG. 15 depicts an example flow chart of a method 1500 of providing up-to-date route constraint information to autonomous vehicles according to example embodiments of the present disclosure. One or more portion(s) of the method 1500 can be implemented by one or more computing devices such as, for example, the remote computing device(s) 150, 1450 of FIGS. 2 and 14. In some examples, such remote computing device(s) can be included as part of a central control system that is in wireless communication with a plurality of autonomous vehicles, such as a fleet of autonomous vehicles providing one or more services (rideshare service, delivery service, courier service, etc.). Furthermore, in the below description of FIG. 15, reference may be made to reference characters representing like features as shown and described with respect to FIG. 14.

FIG. 15 illustrates the remote computing device 1450 receiving or accessing traffic flow constraint information from one or more central road planning resources 1410 and/or traffic monitoring resources 1405 at 1502. As described herein, the traffic flow constraint information may be accessed and received manually by an administrator 1455 or automatically by the remote computing device 1450. Based on the traffic constraint information, the remote computing device 1450 can update autonomy map constraints for autonomous vehicles 1490 operating in the given region at 1504. As provided herein, the "autonomy map" can comprise a road grid within a road network on which the autonomous vehicles 1490 can operate. In certain implementations, the autonomy map corresponds to on-board sub-maps or localization maps that the autonomous vehicles 1490 utilize to compare with live sensor data. Accordingly, in updating the autonomy map constrains, the remote computing device 1450 can generate exclusion polygons or areas that define forbidden road segments through which the autonomous vehicles 1490 are forbidden to operate.

The remote computing device 1450 may then generate and transmit non-routable data, indicating the autonomy map constraints, to the autonomous vehicles 1490 at 1506. In various examples described herein, the remote computing device 1450 generates a constraint file that defines the non-routable data (e.g., identifying the lane or road segments that are closed or blocked), and transmits the constraint file to the autonomous vehicles 1490. Thereafter, the autonomous vehicles 1490 are prevented from planning routes that enter the forbidden road segments.

As noted above, the inventors have recognized that there are many situations where an FBR constraint is applied but the operators do not actually mean "do not enter this area and the only safe thing to do in this area is stop moving." What they actually mean is "do not enter this area and exit it if you are currently in it." For example, in the case of a planned parade route, it is undesirable for an autonomous vehicle to enter the parade route after the constraints annotating the parade route have been deployed. On the other hand, it is perfectly appropriate that any autonomous vehicle currently traversing the parade route be allowed to continue moving, so long as the autonomous vehicle exits the area of the parade route as expediently as possible as there is no immediate safety risk. Constraints for implementing such a feature described herein as depart constraints will now be described.

Generally speaking, depart constraints are associated with certain lanes to set them apart as depart constraint lanes, i.e., lanes that an autonomous vehicle should not enter and can only be used by the autonomous vehicle to leave the depart constraint area. The depart constraint area thus indicates that the area can be traversed by autonomous vehicles already inside the area when the constraints are imposed, that the area can be exited by autonomous vehicles already inside the area, that autonomous vehicles outside the area cannot enter the area after the depart constraints are imposed, and that traversal should bias towards exiting the area as expediently as practical. Lanes marked with a depart constraint should be avoided unless the autonomous vehicle is already in depart lanes. The depart lanes should only be used for leaving the constrained area and have high cost so that the autonomous vehicle will leave the area as soon as possible. The route determiner 122 will receive a list of depart constrained lanes for consideration for optimal routing, though with the associated costs. Such operations provide fleet operators applying constraints with more expressive options in order to convey the actual behaviors they wish to impart on the autonomous vehicle fleet while maintaining the highest possible level of safety.

Figure 16A:
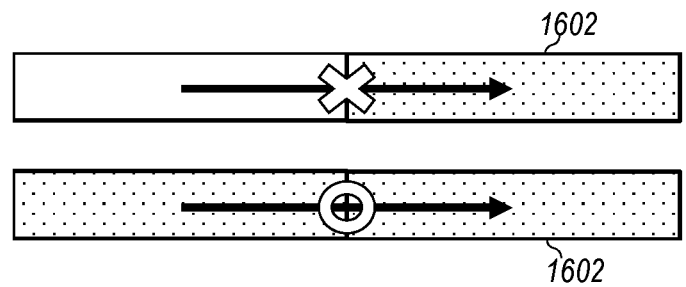
FIG. 16A illustrates a lane marked by a depart constraint that may not be entered from any lane which is not also marked with a depart constraint.
Figure 16B:
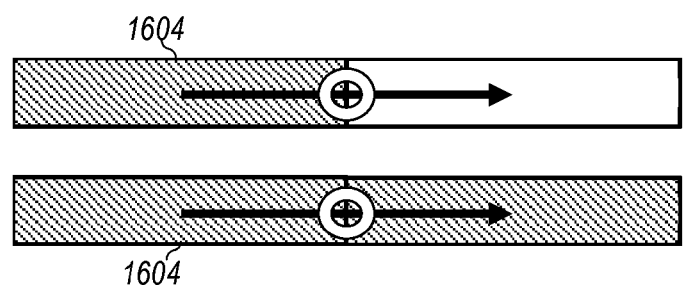
FIG. 16B illustrates a lane marked with a depart constraint that may be exited into lanes which may or may not be marked with a depart constraint.
Figure 16C:
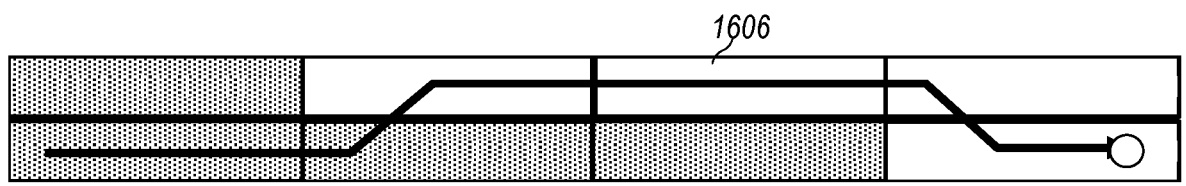
FIG. 16C illustrates a lane marked with a depart constraint that is considered "high cost" relative to lanes not marked with a depart constraint.

The depart constraint effect described herein may be implemented as follows. The semantics of the depart constraint effect include a node (lane, or other similar logical graph unit consumed by a routing engine) marked by a depart constraint 1602 that may not be entered from any node which is not also marked with a depart constraint as illustrated in FIG. 16A. However, a node marked with a depart constraint 1604 may be exited into nodes which may or may not be marked with a depart constraint as illustrated in FIG. 16B. Also, a node marked with a depart constraint is considered "high cost" relative to nodes not marked with a depart constraint such that on average routes exit areas marked with a depart constraint are exited as expediently as practical, even if this results in a "less efficient" route 1606 from a distance/time perspective, as illustrated in FIG. 16C.

In terms of hierarchy within the navigation options, the depart constraint will be given opacity such that the only constraint effect that can mask it is Forbid Routing. In order to support autonomous vehicle operations, it will be possible for a node to be marked both Routable Non-Auto (RNA) and Depart constraints. In this situation, a semi-autonomous vehicle will follow the normal Depart constraint semantics but will be required to operate in manual mode. In a fully autonomous vehicle context, such a node would be promoted to FBR due to the RNA constraints through a constraints promotion process.

FIGS. 17 and 18 illustrate sample use case diagrams for the depart constraint feature.

Figure 17A:
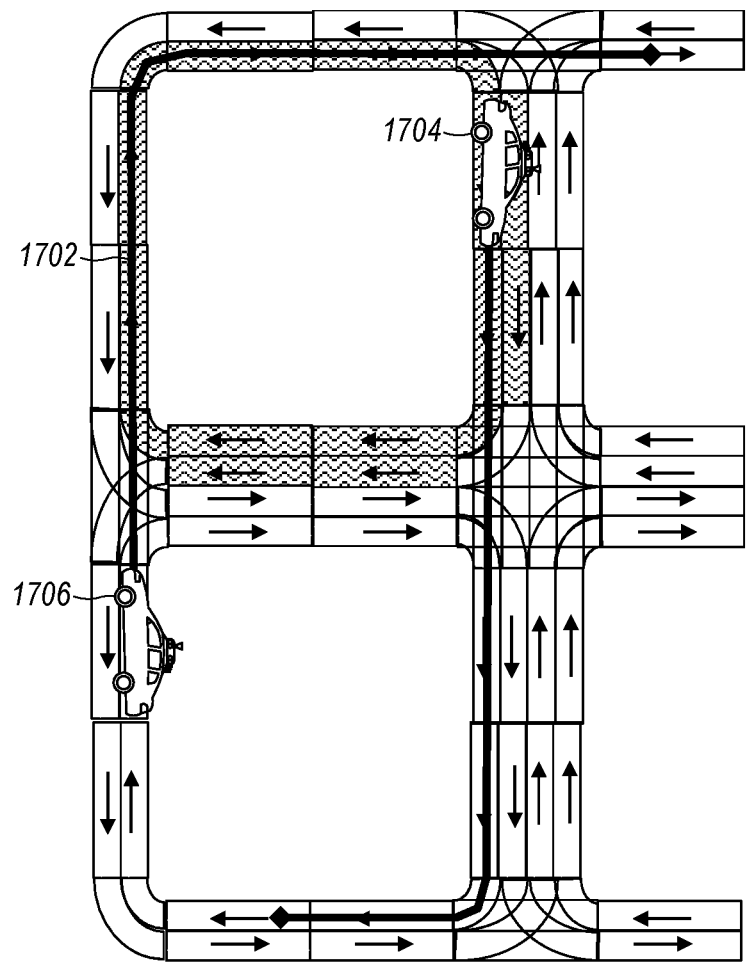
FIG. 17A illustrates a set of road closures for a use case for constraining out a non-immediate-safety-concern exclusion zone such as a parade route.
Figure 17B:
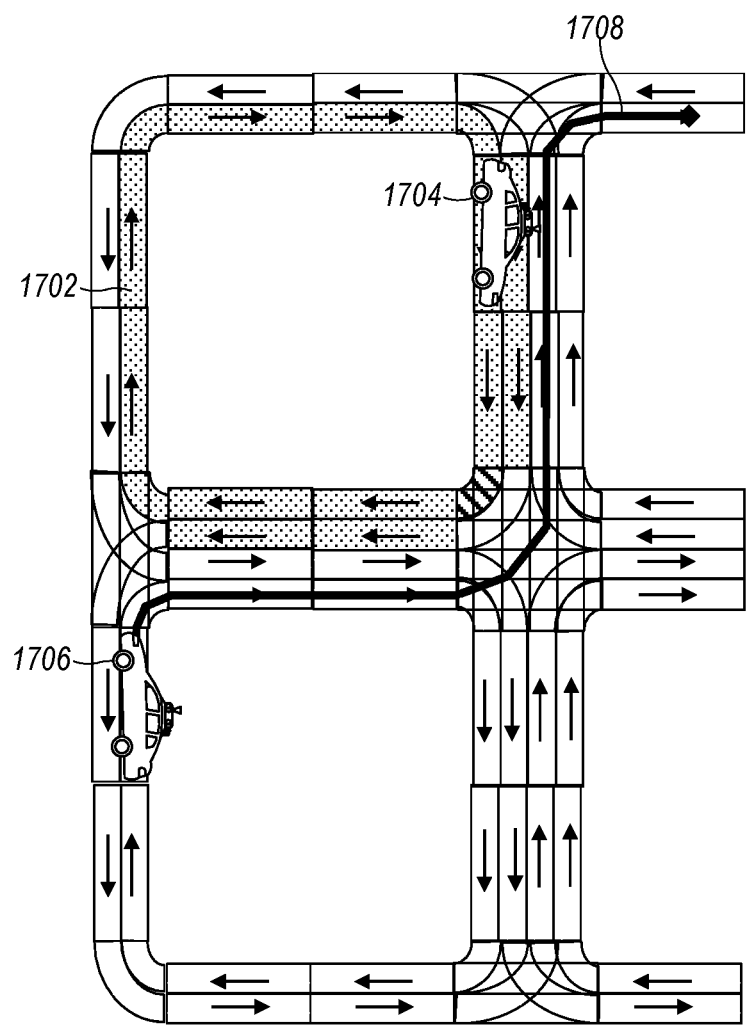
FIG. 17B illustrates the set of road closures of FIG. 17A where forbidden routing constraints are applied to the road closure area.

FIG. 17 illustrates a use case for constraining out a non-immediate-safety-concern exclusion zone such as a parade route. In the scenario of FIG. 17, a pre-announced set of road closures, such as a parade route or running race route, have been received by the operator, who wishes to proactively clear the route of autonomous vehicles 102 and to ensure that new autonomous vehicles will not attempt to route through the road closures. For the sake of this example, it will be assumed that the environment of the parade route looks like FIG. 17A, with area 1702 representing the expected road closure areas for the parade. In this example, autonomous vehicle 1704 is within the road closure area 1702 and autonomous vehicle 1706 is outside the road closure area 1702. If FBR constraints were applied to road closure area 1702 as in FIG. 17B, autonomous vehicle 1704 inside the road closure area 1702 would be instructed to stop moving and would become stuck. On the other hand, the autonomous vehicle 1706 which is outside the road closure area 1702 is able to successfully reroute along route 1708 to avoid the road closure area 1702.

Figure 17C:
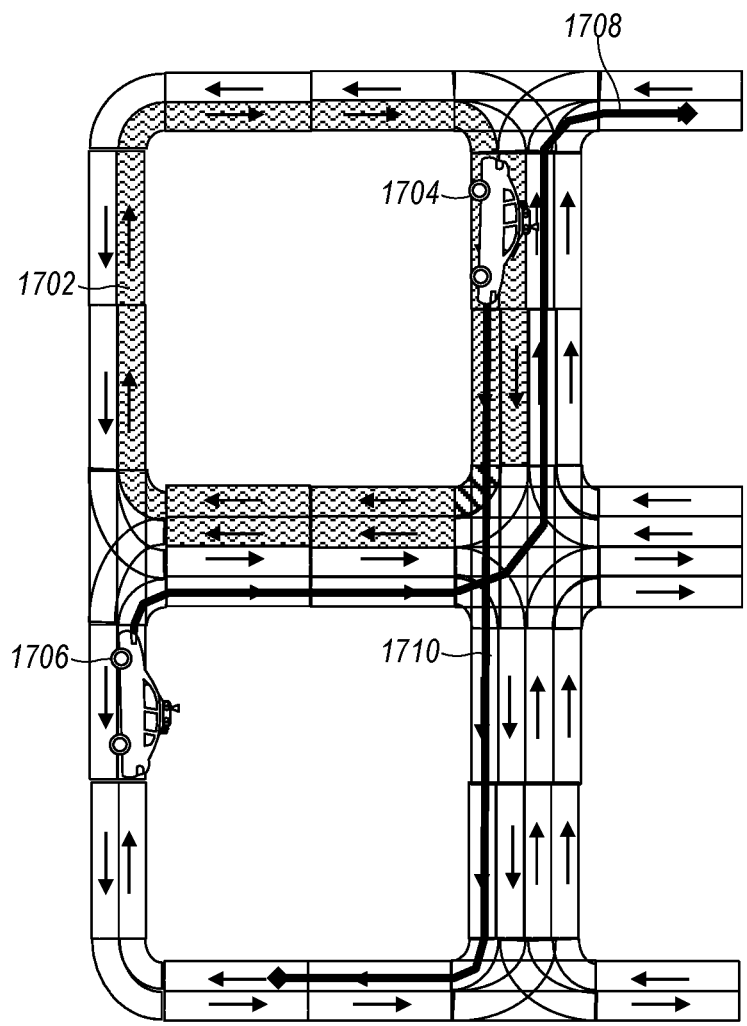
FIG. 17C illustrates the set of road closures of FIG. 17A where a depart constraint is applied to road closure area instead of the forbidden routing constraint.

However, as illustrated in FIG. 17C, if a depart constraint is applied to road closure area 1702 instead of the FBR constraint, the autonomous vehicle 1704 inside the road closure area 1702 will continue to route, exiting the road closure area 1702 as soon as possible along route 1710. The autonomous vehicle 1706 outside the road closure area 1702 exhibits the same behavior as when under the FBR constraint, rerouting around the road closure area 1702 along route 1708. In this manner, the depart constraint enables the autonomous vehicle 1704 to safely exit the road closure area 1702 without stranding any passengers in autonomous vehicle 1704.

Figure 18A:
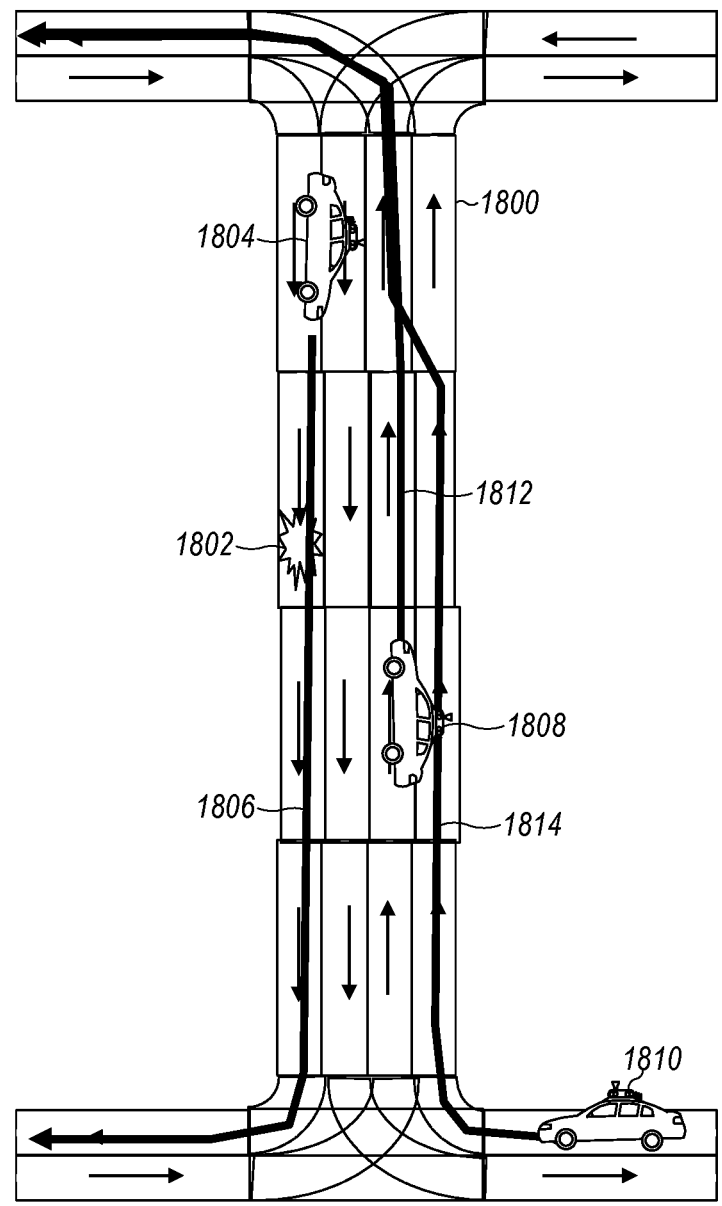
FIG. 18A illustrates a use case for escaping a localized safety hazard such as a burning bridge or sinkhole.

FIG. 18 illustrates a use case for escaping a localized safety hazard such as fallen power lines, a fallen tree, a burning bridge, a sinkhole, and the like. In the scenario of FIG. 18, a localized safety hazard has arisen, such as a bridge 1800 catching on fire, or a sinkhole opening in the road at 1802 as illustrated in FIG. 18A. In the immediate area of the safety hazard 1802 (in the node that's on fire, or is now a hole in the ground), the safest thing to do is for the autonomous vehicle 1804 to stop moving and to not complete route 1806. However, there is likely some radius around the safety hazard 1802 where it remains desirable for the autonomous vehicles, such as autonomous vehicles 1808 and 1810, to keep moving along paths 1812 and 1814, respectively, while preventing autonomous vehicles that are not on the bridge from entering the bridge or the lanes around the sinkhole 1802.

Figure 18B:
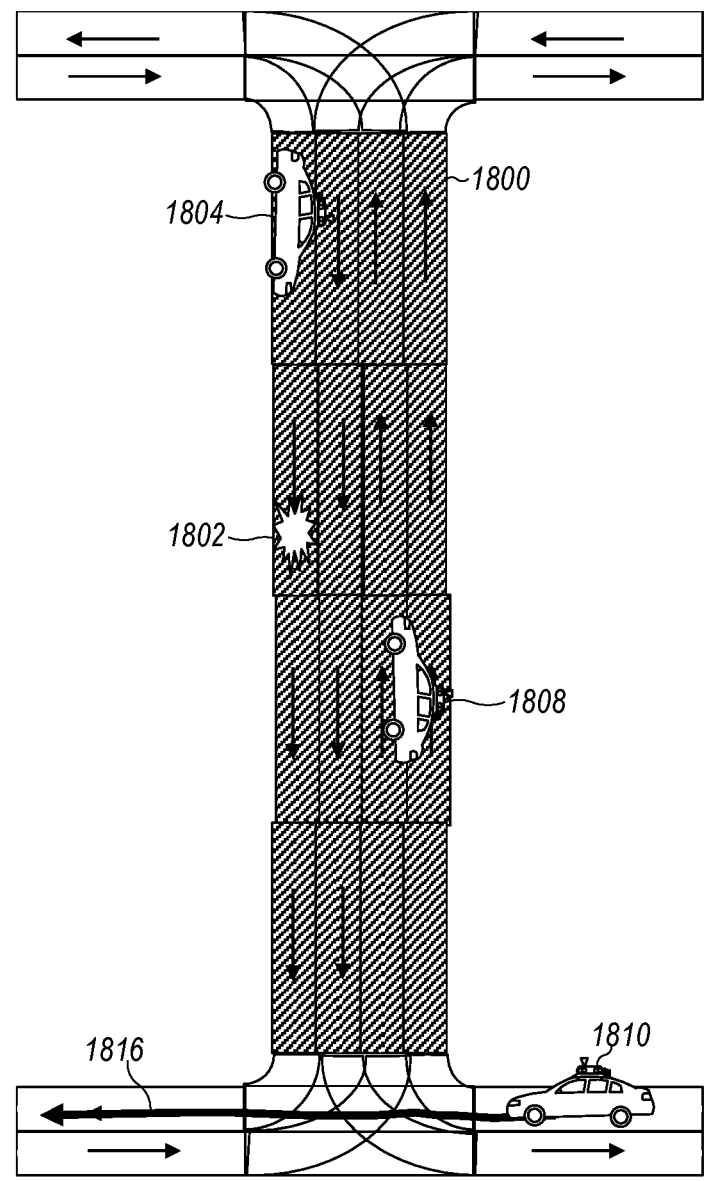
FIG. 18B illustrates the bridge of FIG. 18A with only forbidden routing constraints applied in order to prevent new autonomous vehicles from entering the bridge.

With only FBR constraints applied to the scenario of FIG. 18A, in order to prevent new autonomous vehicles from entering the bridge, the entire bridge 1800 is constrained. As illustrated in FIG. 18B, this means that autonomous vehicles 1804 and 1808 on the bridge 1800 stop moving and get stuck, potentially causing a safety hazard not only for their occupants, but for other motorists on the bridge 1800 behind them. On the other hand, autonomous vehicle 1810 safely avoids the bridge 1800 by traversing path 1816.

Figure 18C:
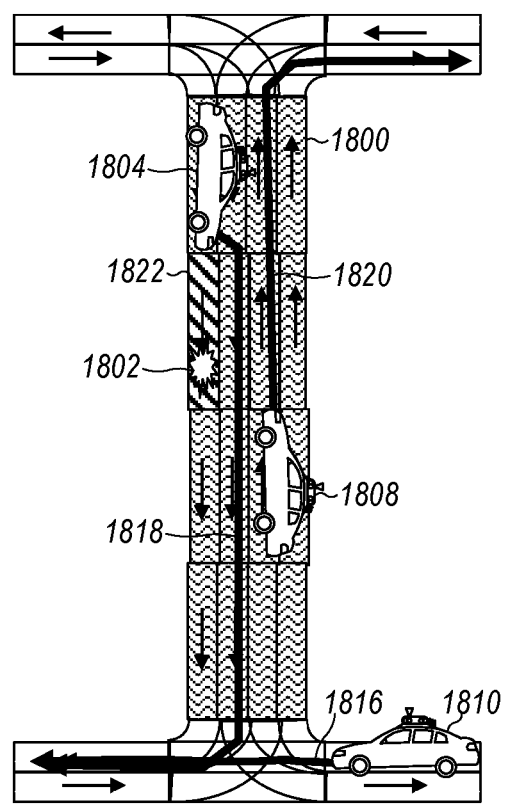
FIG. 18C illustrates the bridge of FIG. 18A with a depart constraint applied to the bridge instead of the forbidden routing constraint.

However, as illustrated in FIG. 18C, if a depart constraint is applied to the bridge 1800 instead of the FBR constraint, the autonomous vehicle 1804 inside the road closure area on bridge 1800 will be rerouted along route 1818, exiting the bridge as soon as possible. Similarly, autonomous vehicle 1808 inside the road closure area on bridge 1800 will continue to route along route 1820, exiting the bridge as soon as possible. On the other hand, autonomous vehicle 1810 that is not on the bridge 1800 does not enter the bridge 1800 and instead reroutes along path 1816 as in the FBR example of FIG. 18B. Thus, with the depart constraint used in concert with an FBR constraint only on the node 1822 including the localized safety hazard, the desired outcome is achieved. The autonomous vehicles 1804 and 1808 on the bridge 1800 are able to safely escape, while the autonomous vehicle 1810 not on the bridge 1800 is able to continue traveling without entering the potentially dangerous area.

The depart constraint effect may be implemented in the same fashions as the other constraints noted above. A new "depart" entry will be added to a configuration file for the new constraint effect to be implemented in the navigation constraint system. The opacity of the depart constraint effect is set to medium so that it will correctly mix with RNA but be masked by FBR. The urgency of the "high cost" requirement for the depart constraint may be configurable separate from HCA constraint, the same cost as the HCA constraint, or a fixed ratio to HCA, as desired.

The depart constraints are implemented by the constraint deployment module 350 (FIG. 3) by consolidating all constraints handling within the route determiner 122 and route planning graph generation. The constraints may be managed by identifying lanes that are forbidden lanes, force manual lanes, high cost lanes and depart lanes. In sample embodiments, the route determiner 122 accepts (and makes a copy) of these lane sets as multiple separated items. Forbidden connections are received along with wide or narrow cost field constraints. For each lane, the constraints manager returns the effect of all of these constraints. For each pair of lanes, the constraints manager returns if it is forbidden or a high cost depart connection. A new cost parameter may be added for a depart lane, as appropriate. Also, cost overlays may be used to overwrite the cost of a lane related to depart lanes. The constraints manager also accepts subscribers for constraint changes notification and calls the subscribers' callback functions whenever a constraint is changed. The routing logic is not changed; the routing logic applies the weights or forbidden nature of a route when it calculates its route through lanes marked with a depart constraint and based on the location of the vehicle relative to the lanes marked with the depart constraint. A routing engine for implementing the routing logic may be included in the route determiner 122 on the vehicle or may be included in an offboard system located in a cloud routing engine, for example.

In sample embodiments, the routing engine in the route determiner 122 receives the active route constraints (e.g., FBR, HCA, RNA, and Depart) as described herein along with a list of lanes that are to be considered for optimal routing. A high cost is assigned to the depart lanes as described herein. The active constraints are received in a file, and the route determiner 122 accepts and makes a copy of the lane set as multiple separated items. The route determiner 122 also receives forbidden connections and wide or narrow cost field constraints. For each lane, the active constraints are processed to apply the appropriate constraints to the respective lanes. Similarly, for each pair of lanes, the active constraints are processed to determine if the lane pair is forbidden or a high cost depart connection. The constraint changes are provided in notifications to subscribers to the routing data to indicate that a constraint has been changed.

It will be appreciated by those skilled in the art that an autonomous vehicle that is moving when the depart constraints are imposed may enter the lanes marked as depart lanes before it has time to stop and/or reroute. In such cases, the area occupied by the autonomous vehicle may be expanded to include those lanes needed to stop and/or reroute the autonomous vehicle as it approaches lanes marked as depart lanes. Also, an area marked as a depart area may be expanded to fill in dead ends that are created by the depart area. For example, in the example of FIG. 18, the entire bridge may be marked as a depart area even if only one lane is affected by the hazard 1802. Also, connected components analysis may be used to find dead ends created by the imposition of the depart area onto a map. The depart area would be expanded to incorporate the connected components as needed to avoid the creation of dead ends as a result of imposition of the depart area onto the map.

Hardware Diagrams

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel. Furthermore, computing tasks discussed herein as being performed at computing device(s) remote from the vehicle can instead be performed at the vehicle (e.g., via the vehicle computing system), or vice versa. Such configurations can be implemented without deviating from the scope of the present disclosure.

Figure 19:
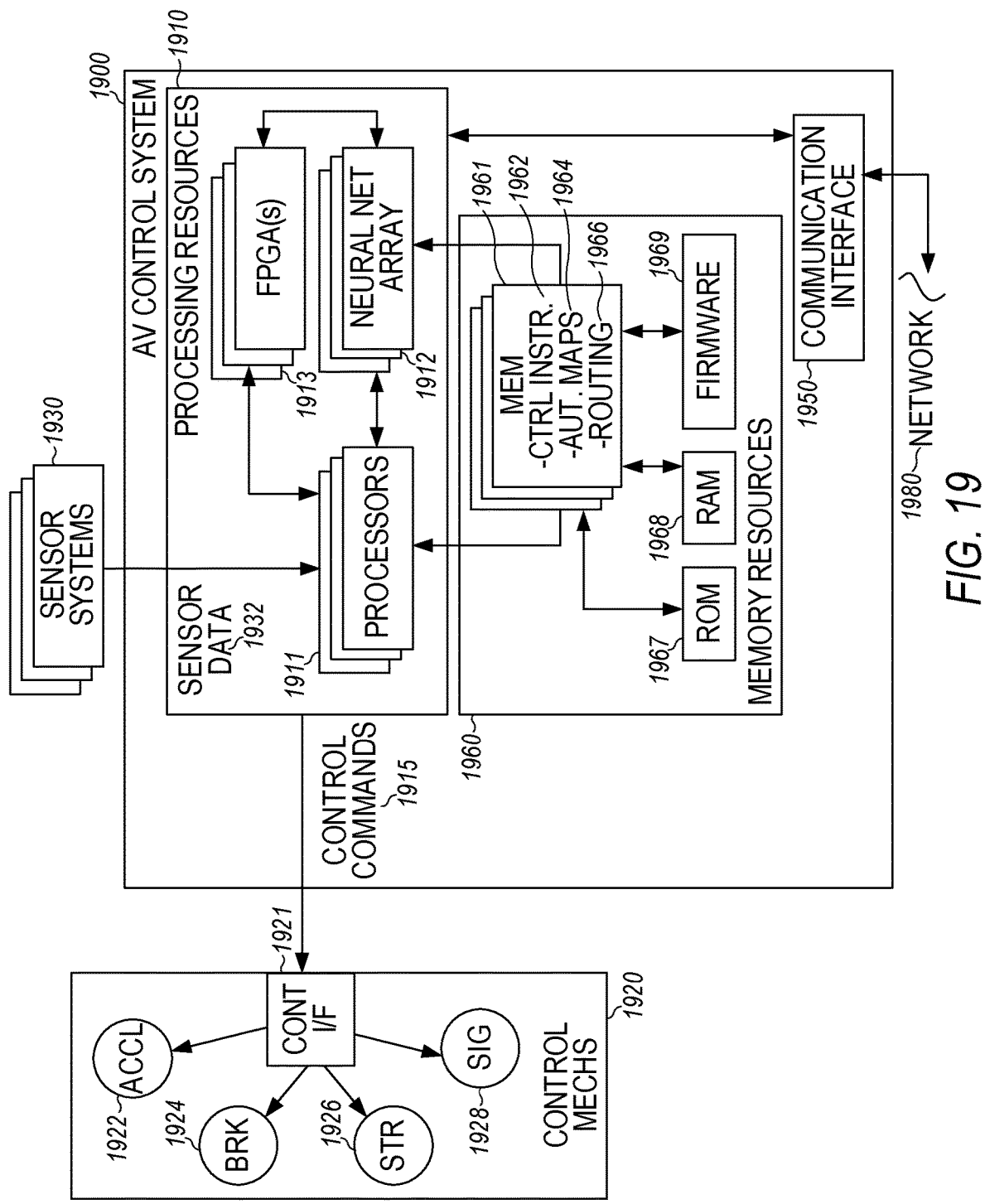
FIG. 19 is a block diagram illustrating a computer system upon which example AV processing systems described herein may be implemented.

FIG. 19 is a block diagram illustrating a computer system upon which example AV processing systems described herein may be implemented. The computer system 1900 can be implemented using a number of processing resources 1910, which can comprise processors 1911, field programmable gate arrays (FPGAs) 1913. In some aspects, any number of processors 1911 and/or FPGAs 1913 of the computer system 1900 can be utilized as components of a neural network array 1912 implementing one or more machine learning models and utilizing road network maps stored in memory 1961 of the computer system 1900. In the context of FIG. 1, various aspects and components of the AV computing device 106 can be implemented using one or more components of the computer system 1900 shown in FIG. 19.

According to some examples, the computer system 1900 may be implemented within an autonomous vehicle (AV) with software and hardware resources such as described with examples of FIG. 1. In an example shown, the computer system 1900 can be distributed spatially into various regions of the AV 102, with various aspects integrated with other components of the AV 102 itself. For example, the processing resources 1910 and/or memory resources 1960 can be provided in a cargo space of the AV 102. The various processing resources 1910 of the computer system 1900 can also execute control instructions 1962 using microprocessors 1911, FPGAs 1913, a neural network array 1912, or any combination of the same. In addition, the computer system 1900 may be in communication with a passenger feedback system of the AV 102, which can include a feedback controller comprising a set of processing and local memory resources storing feedback instructions.

In an example of FIG. 19, the computer system 1900 includes a communication interface 1950 that can enable communications over a network 1980. In one implementation, the communication interface 1950 can also provide a data bus or other local links to electro-mechanical interfaces of the vehicle, such as wireless or wired links to and from control mechanisms 1920 (e.g., via a control interface 1921), sensor systems 1930, and can further provide a network link to a backend transport management system or a remote assistance system (implemented on one or more datacenters) over one or more networks 1980.

The memory resources 1960 can include, for example, main memory 1961, a read-only memory (ROM) 1967, storage device, and cache resources. The main memory 1961 of memory resources 1960 can include random access memory (RAM) 1968 or other dynamic storage device, for storing information and instructions which are executable by the processing resources 1910 of the computer system 1900. The processing resources 1910 can execute instructions for processing information stored with the main memory 1961 of the memory resources 1960. The main memory 1961 can also store temporary variables or other intermediate information which can be used during execution of instructions by the processing resources 1910. The memory resources 1960 can also include ROM 1967 or other static storage device for storing static information and instructions for the processing resources 1910. The memory resources 1960 can also include other forms of memory devices and components, such as a magnetic disk or optical disk, for purpose of storing information and instructions for use by the processing resources 1910. The computer system 1900 can further be implemented using any combination of volatile and/or non-volatile memory, such as flash memory, PROM, EPROM, EEPROM (e.g., storing firmware 1969), DRAM, cache resources, hard disk drives, and/or solid-state drives.

The memory 1961 may also store localization maps 1964 in which the processing resources 1910—executing the control instructions 1962—can continuously compare to sensor data from the various sensor systems 1930 of the AV 102. Execution of the control instructions 1962 can cause the processing resources 1910 to generate control commands 1915 in order to autonomously operate the AV's acceleration 1922, braking 1924, steering 1926, and signaling systems 1928 (collectively, the control mechanisms 1920). Thus, in executing the control instructions 1962, the processing resources 1910 can receive sensor data 1932 from the sensor systems 1930, dynamically compare the sensor data 1932 to a current localization map 1964 and generate control commands 1915 for operative control over the acceleration, steering, and braking of the AV 102. The processing resources 1910 may then transmit the control commands 1915 to one or more control interfaces 1921 of the control mechanisms 1920 to autonomously operate the AV 102 through road traffic on roads and highways, as described throughout the present disclosure.

The memory 1961 may also store routing information 1966 that the processing resources 1910 can utilize to determine routes for the AV 102 to any given destination. In certain examples described herein, the routing information 1966 can further be provided to a network computing system 100 (FIG. 1) to enable the network computing system 100 to select or filter out the AV 102 as a candidate to service transport requests.

Figure 20:
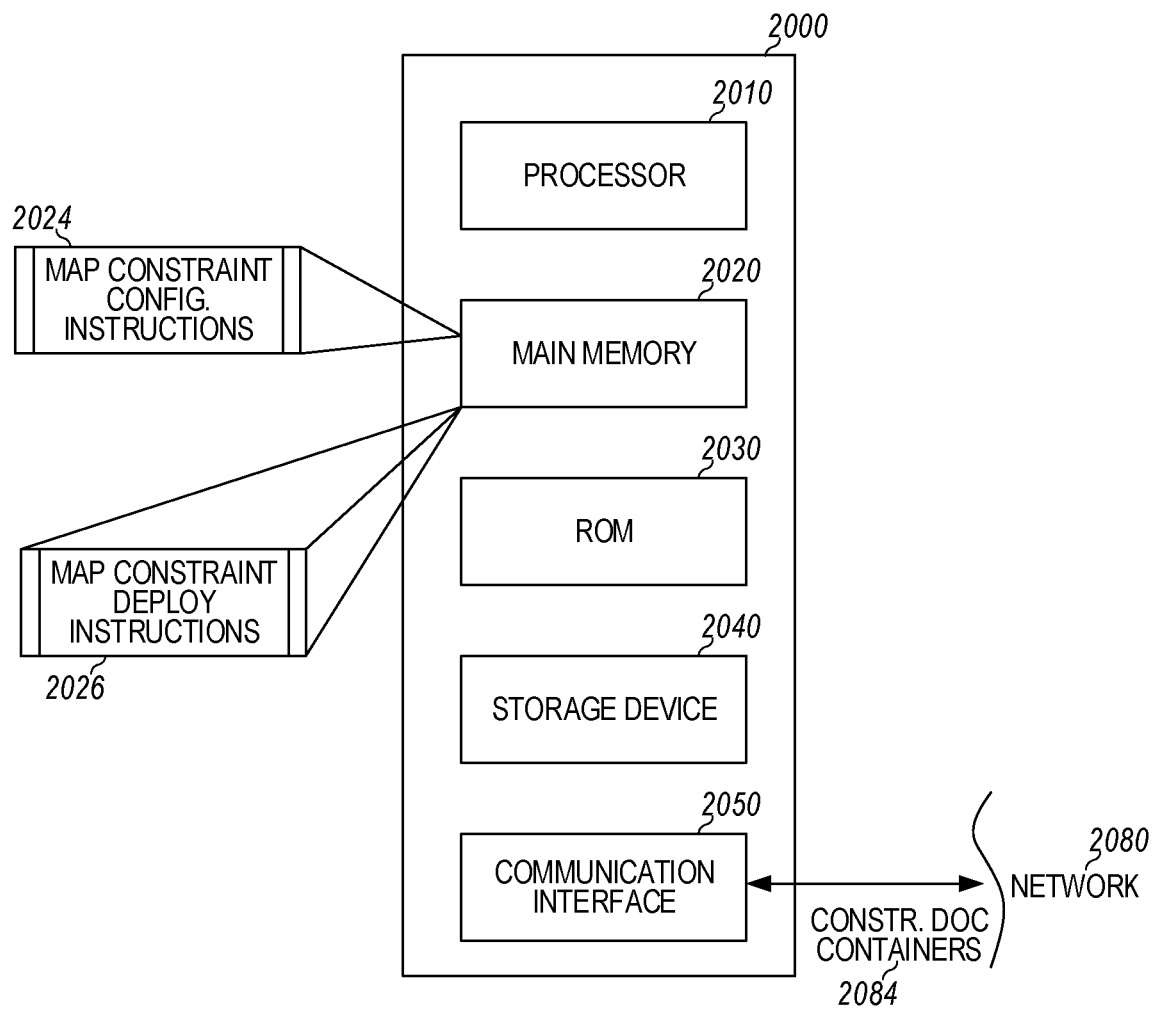
FIG. 20 is a block diagram that illustrates a computer system upon which examples described herein may be implemented.

FIG. 20 is a block diagram that illustrates a computer system upon which examples described herein may be implemented. A computer system 2000 can be implemented on, for example, a server or combination of servers. For example, the computer system 2000 may be implemented as part of a network service for providing transportation services. In the context of FIGS. 1 and 2, the network computing system 100, 200 may be implemented using a computer system 2000 such as described by FIG. 20.

In one implementation, the computer system 2000 includes processing resources 2010, a main memory 2020, a read-only memory (ROM) 2030, a storage device 2040, and a communication interface 2050. The computer system 2000 includes at least one processor 2010 for processing information stored in the main memory 2020, such as provided by a random-access memory (RAM) or other dynamic storage device, for storing information and instructions which are executable by the processor 2010. The main memory 2020 also may be used for storing temporary variables or other intermediate information during execution of instructions to be executed by the processor 2010. The computer system 2000 may also include the ROM 2030 or other static storage device for storing static information and instructions for the processor 2010. A storage device 2040, such as a magnetic disk or optical disk, is provided for storing information and instructions.

The communication interface 2050 enables the computer system 2000 to communicate over one or more networks 2080 (e.g., cellular network) through use of the network link (wireless or wired). Using the network link, the computer system 2000 can communicate with one or more computing devices, one or more servers, and/or one or more AVs 102. The executable instructions stored in the memory 2020 can include selection and map constraint configuration instructions 2024, which enables the computer system 2000 to provide a map constraint interface and receive inputs to amend autonomy map documents from a fleet operator. The instructions can further include map constraint deployment instructions 2026 which enables the computer system 2000 to compress edited autonomy map documents into document images or snapshots and compiled for transmission to AVs 102 for integration into existing autonomy maps.

The processor 2010 is configured with software and/or other logic to perform one or more processes, steps and other functions described with implementations, such as described with respect to FIGS. 1-19, and elsewhere in the present application. Examples described herein are related to the use of the computer system 2000 for implementing the techniques described herein. According to one example, those techniques are performed by the computer system 2000 in response to the processor 2010 executing one or more sequences of one or more instructions contained in the main memory 2020. Such instructions may be read into the main memory 2020 from another machine-readable medium, such as the storage device 2040. Execution of the sequences of instructions contained in the main memory 2020 causes the processor 2010 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer implemented processes discussed herein can be implemented using a single computing device or multiple computing devices working in combination. Databases and applications can be implemented on a single system or distributed across multiple systems. Distributed components can operate sequentially or in parallel. Furthermore, computing tasks discussed herein as being performed at computing device(s) remote from the vehicle can instead be performed at the vehicle (e.g., via the vehicle computing system), or vice versa. Such configurations can be implemented without deviating from the scope of the present disclosure.

The various memories (i.e., 2020, 2030, and/or memory of the processor unit(s) 2010 and/or storage device 2040) may store one or more sets of instructions and data structures (e.g., instructions) 2024 and 2026 embodying or used by any one or more of the methodologies or functions described herein. These instructions, when executed by processor unit(s) 2010 cause various operations to implement the disclosed examples.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 2024 and 2026 can further be transmitted or received over a communications network 2080 using a transmission medium via the network interface device 2050 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

To better illustrate the methods and apparatuses described herein, a non-limiting set of Example embodiments are set forth below as numerically identified Examples.

Example 1 is a computer-implemented method of controlling navigation of an autonomous vehicle, comprising accessing, by one or more processors, map data descriptive of the identity and location of different travel ways within a surrounding environment of the autonomous vehicle; accessing, by the one or more processors, constraint data descriptive of one or more geographic areas or geographic identifiers, within the map data, for which associated navigational constraints are defined, the constraint data comprising a depart constraint that specifies an area that an autonomous vehicle may not enter but may exit if inside the area when the depart constraint is imposed; determining, by the one or more processors, a travel route for navigating the autonomous vehicle based at least in part from the map data evaluated relative to the constraint data including the depart constraint; and controlling, by the one or more processors, motion of the autonomous vehicle based at least in part on the determined travel route.

Example 2 is a method as in Example 1, further comprising imposing the depart constraint on a lane in the map data, the depart constraint indicating that an autonomous vehicle in the lane may continue to traverse the lane while inside the lane and may exit the lane but that an autonomous vehicle outside of the lane may not enter the lane, whereby the lane is given a high traversal cost to bias an autonomous vehicle in the lane towards exiting the lane.

Example 3 is a method as in Examples 1 or 2, wherein the determined travel route comprises a plurality of travel way portions, each travel way portion defined by one or more of a travel way identifier, a start point, an end point, a directionality, or connectivity identifiers for other adjacent travel way portions.

Example 4 is a method as in any of Examples 1-3, wherein the one or more processors receive one or more constraint files including the constraint data from one or more remote computing devices configured to control operation of a fleet of autonomous vehicles.

Example 5 is a method as in any of Examples 1-4, wherein each of the one or more constraint files includes one or more polygons, each polygon having a boundary defined relative to a geographic area and an associated application type.

Example 6 is a method as in any of Examples 1-5, wherein determining the travel route for navigating the autonomous vehicle comprises determining, by the one or more processors, permitted travel way portions, the permitted travel way portions being described by constraint data as (i) having a default permit state, (ii) being completely enclosed by a complete inclusion polygon, or (iii) being completely enclosed or partially touched by a partial inclusion polygon; determining, by the one or more processors, forbidden travel way portions, the forbidden travel way portions being described by the constraint data as (i) having a default forbid state, (ii) being completely enclosed by a complete exclusion polygon, or (iii) being completely enclosed or partially touched by a partial exclusion polygon; and evaluating, by the one or more processors, the map data to account for the permitted travel way portions and the forbidden travel way portions.

Example 7 is a method as in any of Examples 1-6, further comprising the one or more remote computing devices generating a map constraint interface enabling a fleet operator to update map constraints for autonomous vehicles (AVs), the map constraint interface enabling the fleet operator to configure a set of constraint layers of one or more autonomy maps utilized by the AVs for navigation, each constraint layer in the set of constraint layers comprising a toggle feature that enables the fleet operator to activate and deactivate the constraint layer; receiving, via the map constraint interface, a set of inputs configuring the set of constraint layers of the one or more autonomy maps; compiling a set of map constraints corresponding to the configured set of constraint layers into a document container; and outputting, via a communication interface over one or more networks, the document container to a subset of the AVs to enable the subset of AVs to integrate the set of map constraints with the one or more autonomy maps.

Example 8 is a computing system for controlling navigation of an autonomous vehicle, comprising one or more processors; and one or more memory devices, the one or more memory devices storing instructions that when executed by the one or more processors cause the one or more processors to perform operations, the operations comprising accessing map data descriptive of the identity and location of different travel ways within a surrounding environment of the autonomous vehicle; accessing constraint data descriptive of one or more geographic areas or geographic identifiers, within the map data, for which associated navigational constraints are defined, the constraint data comprising a depart constraint that specifies an area that an autonomous vehicle may not enter but may exit if inside the area when the depart constraint is imposed; determining a travel route for navigating the autonomous vehicle based at least in part from the map data evaluated relative to the constraint data including the depart constraint; and controlling motion of the autonomous vehicle based at least in part on the determined travel route.

Example 9 is a computing system as in Example 8, wherein the one or more memory devices further stores instructions that when executed by the one or more processors cause the one or more processors to impose the depart constraint on a lane in the map data, the depart constraint indicating that an autonomous vehicle in the lane may continue to traverse the lane while inside the lane and may exit the lane but that an autonomous vehicle outside of the lane may not enter the lane, whereby the lane is given a high traversal cost to bias an autonomous vehicle in the lane towards exiting the lane.

Example 10 is a computing system as in Example 8 or 9, wherein the determined travel route comprises a plurality of travel way portions, each travel way portion defined by one or more of a travel way identifier, a start point, an end point, a directionality, or connectivity identifiers for other adjacent travel way portions.

Example 11 is a computing system as in any of Examples 8-10, further comprising one or more remote computing devices configured to control operation of a fleet of autonomous vehicles, the one or more remote computing devices providing one or more constraint files including the constraint data to the one or more processors.

Example 12 is a computing system as in any of Examples 8-11, wherein each of the one or more constraint files includes one or more polygons, each polygon having a boundary defined relative to a geographic area and an associated application type.

Example 13 is a computing system as in any of Examples 8-12, wherein the one or more memory devices further store instructions that when executed by the one or more processors cause the one or more processors to determine the travel route for navigating the autonomous vehicle by determining permitted travel way portions, the permitted travel way portions being described by constraint data as (i) having a default permit state, (ii) being completely enclosed by a complete inclusion polygon, or (iii) being completely enclosed or partially touched by a partial inclusion polygon; determining forbidden travel way portions, the forbidden travel way portions being described by the constraint data as (i) having a default forbid state, (ii) being completely enclosed by a complete exclusion polygon, or (iii) being completely enclosed or partially touched by a partial exclusion polygon; and evaluating the map data to account for the permitted travel way portions and the forbidden travel way portions.

Example 14 is a computing system as in any of Examples 8-13, wherein the one or more remote computing devices include instructions that when executed by the one or more remote computing devices cause the one or more remote computing devices to generate a map constraint interface enabling a fleet operator to update map constraints for autonomous vehicles (AVs), the map constraint interface enabling the fleet operator to configure a set of constraint layers of one or more autonomy maps utilized by the AVs for navigation, each constraint layer in the set of constraint layers comprising a toggle feature that enables the fleet operator to activate and deactivate the constraint layer; receive, via the map constraint interface, a set of inputs configuring the set of constraint layers of the one or more autonomy maps; compile a set of map constraints corresponding to the configured set of constraint layers into a document container; and output, via a communication interface over one or more networks, the document container to a subset of the AVs to enable the subset of AVs to integrate the set of map constraints with the one or more autonomy maps.

Example 15 is an autonomous vehicle, comprising one or more communication interfaces for wirelessly communicating with one or more remote computing devices configured to control operation of a fleet of autonomous vehicles; one or more processors; and one or more non-transitory computer-readable media that collectively store instructions that, when executed by the one or more processors, cause the one or more processors to perform operations, the operations comprising accessing map data descriptive of the identity and location of different travel ways within a surrounding environment of the autonomous vehicle; accessing constraint data descriptive of one or more geographic areas or geographic identifiers, within the map data, for which associated navigational constraints are defined, the constraint data comprising a depart constraint that specifies an area that an autonomous vehicle may not enter but may exit if inside the area when the depart constraint is imposed; determining a travel route for navigating the autonomous vehicle based at least in part from the map data evaluated relative to the constraint data including the depart constraint; and controlling motion of the autonomous vehicle based at least in part on the determined travel route.

Example 16 is an autonomous vehicle as in Example 15, wherein the one or more non-transitory computer-readable media further store instructions that when executed by the one or more processors cause the one or more processors to impose the depart constraint on a lane in the map data, the depart constraint indicating that when the autonomous vehicle is in the lane the autonomous vehicle may continue to traverse the lane while inside the lane and may exit the lane but that when the autonomous vehicle is outside of the lane the autonomous vehicle may not enter the lane, whereby the lane is given a high traversal cost to bias the autonomous vehicle when in the lane towards exiting the lane.

Example 17 is an autonomous vehicle as in Examples 15 or 16, wherein the determined travel route comprises a plurality of travel way portions, each travel way portion defined by one or more of a travel way identifier, a start point, an end point, a directionality, or connectivity identifiers for other adjacent travel way portions.

Example 18 is an autonomous vehicle as in any of Examples 15-17, wherein the one or more communication interfaces receive from the one or more remote computing devices one or more constraint files including the constraint data.

Example 19 is an autonomous vehicle as in any of Examples 15-18, wherein each of the one or more constraint files includes one or more polygons, each polygon having a boundary defined relative to a geographic area and an associated application type.

Example 20 is an autonomous vehicle as in any of Examples 15-19, wherein the one or more non-transitory computer-readable media further store instructions that when executed by the one or more processors cause the one or more processors to determine the travel route for navigating the autonomous vehicle by determining permitted travel way portions, the permitted travel way portions being described by constraint data as (i) having a default permit state, (ii) being completely enclosed by a complete inclusion polygon, or (iii) being completely enclosed or partially touched by a partial inclusion polygon; determining forbidden travel way portions, the forbidden travel way portions being described by the constraint data as (i) having a default forbid state, (ii) being completely enclosed by a complete exclusion polygon, or (iii) being completely enclosed or partially touched by a partial exclusion polygon; and evaluating the map data to account for the permitted travel way portions and the forbidden travel way portions.

Example 21 is an autonomous vehicle as in any of Examples 15-20, further comprising one or more autonomy maps, wherein the one or more communication interfaces receive from the one or more remote computing devices the one or more constraint files including a set of map constraints in a document container, the map constraints being integrated with the one or more autonomy maps.

Example 22 is a computing device for controlling one or more autonomous vehicles, the computing device comprising one or more processors; and a memory storing instructions that, when executed by the one or more processors, cause the one or more processors to receive, from one or more networks, traffic flow constraint information from at least one of a central planning resource or a traffic monitoring resource; based on the traffic flow constraint information, update autonomy map constraints for autonomous vehicles operating in a given region, the autonomy map including constraint data defining constraints descriptive of one or more geographic areas or geographic identifiers for which associated navigational constraints are defined, the constraint data comprising a depart constraint that specifies an area that an autonomous vehicle may not enter but may exit if inside the area when the depart constraint is imposed; and transmit, over the one or more networks, data indicating the autonomy map constraints to the one or more autonomous vehicles.

Example 23 is a computing device as in Example 22, wherein the executed instructions cause the one or more processors to generate a constraint file comprising the constraint data and to transmit the constraint file to the one or more autonomous vehicles.

24. Example 24 is a computing device as in Examples 22 or 23, wherein the traffic flow constraint information identifies a planned event that corresponds to a road segment closure within the given region.

Example 25 is a computing device as in any of Examples 22-24, wherein the planned event corresponds to at least one of road construction or utility servicing.

Example 26 is a computing device as in any of Examples 22-25, wherein the planned event comprises at least one of a protest, a parade, a sporting event, and a festival.

Example 27 is a computing device as in any of Examples 22-26, wherein traffic flow constraint information is received from a live, crowded-sourced traffic resource.

Example 28 is a computing device as in any of Examples 22-27, wherein the one or more processors selectively transmit the data indicating the autonomy map constraints to the one or more autonomous vehicles based on the one or more autonomous vehicles each being on a current route converging towards or intersecting with a road segment closure defined by the autonomy map constraints.

Example 29 is a non-transitory computer-readable medium storing instructions that, when executed by one or more processors, cause the one or more processors to control navigation of an autonomous vehicle by accessing map data descriptive of the identity and location of different travel ways within a surrounding environment of the autonomous vehicle; accessing constraint data descriptive of one or more geographic areas or geographic identifiers, within the map data, for which associated navigational constraints are defined, the constraint data comprising a depart constraint that specifies an area that an autonomous vehicle may not enter but may exit if inside the area when the depart constraint is imposed; determining a travel route for navigating the autonomous vehicle based at least in part from the map data evaluated relative to the constraint data including the depart constraint; and controlling motion of the autonomous vehicle based at least in part on the determined travel route.

Example 30 is a medium as in Example 29, further comprising instructions that, when executed by one or more processors, cause the one or more processors to impose the depart constraint on a lane in the map data, the depart constraint indicating that an autonomous vehicle in the lane may continue to traverse the lane while inside the lane and may exit the lane but that an autonomous vehicle outside of the lane may not enter the lane, whereby the lane is given a high traversal cost to bias an autonomous vehicle in the lane towards exiting the lane.

Example 31 is a medium as in Examples 29 or 30, wherein the determined travel route comprises a plurality of travel way portions, each travel way portion defined by one or more of a travel way identifier, a start point, an end point, a directionality, or connectivity identifiers for other adjacent travel way portions.

Example 32 is a medium as in any of Examples 29-31, further comprising instructions that, when executed by the one or more processors, cause the one or more processors to receive one or more constraint files including the constraint data from one or more remote computing devices configured to control operation of a fleet of autonomous vehicles.

Example 33 is a medium as in any of Examples 29-32, wherein each of the one or more constraint files includes one or more polygons, each polygon having a boundary defined relative to a geographic area and an associated application type.

Example 34 is a medium as in any of Examples 29-33, wherein instructions for determining the travel route for navigating the autonomous vehicle further comprises instructions that, when executed by the one or more processors, cause the one or more processors to determine permitted travel way portions, the permitted travel way portions being described by constraint data as (i) having a default permit state, (ii) being completely enclosed by a complete inclusion polygon, or (iii) being completely enclosed or partially touched by a partial inclusion polygon; determine forbidden travel way portions, the forbidden travel way portions being described by the constraint data as (i) having a default forbid state, (ii) being completely enclosed by a complete exclusion polygon, or (iii) being completely enclosed or partially touched by a partial exclusion polygon; and evaluate the map data to account for the permitted travel way portions and the forbidden travel way portions.

Example 35 is a non-transitory computer-readable medium storing instructions that, when executed by one or more processors, cause the one or more processors to control one or more autonomous vehicles by receiving, from one or more networks, traffic flow constraint information from at least one of a central planning resource or a traffic monitoring resource; based on the traffic flow constraint information, updating autonomy map constraints for autonomous vehicles operating in a given region, the autonomy map including constraint data defining constraints descriptive of one or more geographic areas or geographic identifiers for which associated navigational constraints are defined, the constraint data comprising a depart constraint that specifies an area that an autonomous vehicle may not enter but may exit if inside the area when the depart constraint is imposed; and transmitting, over the one or more networks, data indicating the autonomy map constraints to the one or more autonomous vehicles.

Example 36 is a medium as in Example 35, further comprising instructions that, when executed by the one or more processors, cause the one or more processors to generate a constraint file comprising the constraint data and to transmit the constraint file to the one or more autonomous vehicles.

Example 37 is a medium as in Examples 35 or 36, wherein the traffic flow constraint information identifies a planned event that corresponds to a road segment closure within the given region.

Example 38 is a medium as in any of Examples 35-37, wherein the planned event corresponds to at least one of road construction or utility servicing.

Example 39 is a medium as in any of Examples 35-38, wherein the planned event comprises at least one of a protest, a parade, a sporting event, and a festival.

Example 40 is a medium as in any of Examples 35-39, wherein traffic flow constraint information is received from a live, crowded-sourced traffic resource.

Example 41 is a medium as in any of Examples 35-40, further comprising instructions that, when executed by the one or more processors, cause the one or more processors to selectively transmit the data indicating the autonomy map constraints to the one or more autonomous vehicles based on the one or more autonomous vehicles each being on a current route converging towards or intersecting with a road segment closure defined by the autonomy map constraints.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of such features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A computer-implemented method of controlling navigation of an autonomous vehicle, comprising:
 accessing, by one or more processors, map data describing a plurality of travel way portions;
 accessing, by the one or more processors, constraint data descriptive of a set of the plurality of travel way portions having associated navigational constraints, the constraint data comprising a depart constraint for a first travel way portion of the plurality of travel way portions, wherein the depart constraint specifies that an autonomous vehicle is not permitted to enter the first travel way portion from another travel way portion that does not have a depart constraint but is permitted to enter the first travel way portion from another travel way portion that does have a depart constraint;
 determining, by the one or more processors, a travel route for navigating the autonomous vehicle based at least in part from the map data evaluated relative to the constraint data including the depart constraint, the travel route entering the first travel way portion from a second travel way portion that has a depart constraint; and
 controlling, by the one or more processors, motion of the autonomous vehicle based at least in part on the determined travel route.

2. The computer-implemented method of claim 1, wherein the depart constraint also specifies that an autonomous vehicle in the first travel way portion may continue to traverse the first travel way portion while inside the first travel way portion and may exit the first travel way portion but that an autonomous vehicle outside of the first travel way portion may not enter the first travel way portion, whereby the first travel way portion is given a high traversal cost to bias an autonomous vehicle in the first travel way portion towards exiting the first travel way portion.

3. The computer-implemented method of claim 1, wherein the determined travel route comprises a plurality of travel way portions, each travel way portion defined by one or more of a travel way identifier, a start point, an end point, a directionality, or connectivity identifiers for other adjacent travel way portions.

4. The computer-implemented method of claim 1, wherein the one or more processors receive one or more constraint files including the constraint data from one or more remote computing devices configured to control operation of a fleet of autonomous vehicles.

5. The computer-implemented method of claim 4, wherein each of the one or more constraint files includes one or more polygons, each polygon having a boundary defined relative to a geographic area and an associated application type.

6. The computer-implemented method of claim 5, wherein determining the travel route for navigating the autonomous vehicle comprises:
  determining, by the one or more processors, permitted travel way portions, the permitted travel way portions being described by constraint data as (i) having a default, permit state, (ii) being completely enclosed by a complete inclusion polygon, or (iii) being completely enclosed or partially touched by a partial inclusion polygon;
  determining, by the one or more processors, forbidden travel way portions, the forbidden travel way portions being described by the constraint data as (i) having a default forbid state, (ii) being completely enclosed by a complete exclusion polygon, or (iii) being completely enclosed or partially touched by a partial exclusion polygon; and
  evaluating, by the one or more processors, the map data to account for the permitted travel way portions and the forbidden travel way portions.

7. The computer-implemented method of claim 4, further comprising the one or more remote computing devices:
  generating a map constraint interface enabling a fleet operator to update map constraints for autonomous vehicles (AVs), the map constraint interface enabling the fleet operator to configure a set of constraint layers of one or more autonomy maps utilized by the AVs for navigation, each constraint layer in the set of constraint layers comprising a toggle feature that enables the fleet operator to activate and deactivate the constraint layer;
  receiving, via the map constraint interface, a set of inputs configuring the set of constraint layers of the one or more autonomy maps;
  compiling a set of map constraints corresponding to the configured set of constraint layers into a document container; and
  outputting, via a communication interface over one or more networks, the document container to a subset of the AVs to enable the subset of AVs to integrate the set of map constraints with the one or more autonomy maps.

8. A computing system for controlling navigation of an autonomous vehicle, the computing system comprising:
  one or more processors; and
  one or more memory devices, the one or more memory devices storing instructions that when executed by the one or more processors cause the one or more processors to perform operations comprising:
    accessing map data, describing a plurality of travel way portions;
    accessing constraint data descriptive of a set of the plurality of travel way portions having associated navigational constraints, the constraint data comprising a depart constraint for a first travel way portion of the plurality of travel way portions, wherein the depart constraint specifies that an autonomous vehicle is not permitted to enter the first travel way portion from another travel way portion that does not have a depart constraint but is permitted to enter the first travel way portion that does have a depart constraint;
    determining a travel route for navigating the autonomous vehicle based at least in part from the map data evaluated relative to the constraint data including the depart constraint, the travel route entering the first travel way portion from a second travel way portion that has a depart constraint; and
    controlling motion of the autonomous vehicle based at least in part on the determined travel route.

9. The computing system of claim 8, wherein the depart constraint also specifies that an autonomous vehicle in the first travel way portion may continue to traverse the first travel way portion while inside the first travel way portion and may exit the first travel way portion but that an autonomous vehicle outside of the first travel way portion may not enter the first travel way portion, whereby the first travel way portion is given a high traversal cost to bias an autonomous vehicle in the first travel way portion towards exiting the first travel way portion.

10. The computing system of claim 8, wherein the determined travel route comprises a plurality of travel way portions, each travel way portion defined by one or more of a travel way identifier, a start point, an end point; a directionality, or connectivity identifiers for other adjacent travel way portions.

11. The computing system of claim 8, further comprising one or more remote computing devices configured to control operation of a fleet of autonomous vehicles, the one or more remote computing devices providing one or more constraint files including the constraint data to the one or more processors.

12. The computing system of claim 11, wherein each of the one or more constraint files includes one or more polygons, each polygon having a boundary defined relative to a geographic area and an associated application type.

13. The computing system of claim 12, where in the one or more memory devices further store instructions that when executed by the one or more processors cause the one or more processors to determine the travel route for navigating the autonomous vehicle by:
  determining permitted travel way portions, the permitted travel way portions being described by constraint data as (i) having a default permit state, (ii) being completely enclosed by a complete inclusion polygon, or (iii) being completely enclosed or partially touched by a partial inclusion polygon;
  determining forbidden travel way portions, the forbidden travel way portions being described by the constraint data as (i) having a default forbid state, (ii) being completely enclosed by a complete exclusion polygon, or (iii) being completely enclosed or partially touched by a partial exclusion polygon; and
  evaluating the map data to account for the permitted travel way portions and the forbidden travel way portions.

14. The computing system of claim 11, wherein the one or more remote computing devices include instructions that when executed by the one or more remote computing devices cause the one or more remote computing devices to:
  generate a map constraint interface enabling a fleet operator to update map constraints for autonomous vehicles (AVs), the map constraint interface enabling the fleet operator to configure a set of constraint layers of one or more autonomy maps utilized by the AVs for navigation, each constraint layer in the set of constraint layers comprising a toggle feature that enables the fleet operator to activate and deactivate the constraint layer;

receive, via the map constraint interface, a set of inputs configuring the set of constraint layers of the one or more autonomy maps;

compile a set of map constraints corresponding to the configured set of constraint layers into a document container; and output, via a communication interface over one or more networks, the document container to a subset of the AVs to enable the subset of AVs to integrate the set of map constraints with the one or more autonomy maps.

15. An autonomous vehicle, comprising:

one or more communication interfaces for wirelessly communicating with one or more remote computing devices configured to control operation of a fleet of autonomous vehicles;

one or more processors; and one or more non-transitory computer-readable media that collectively store instructions that, when executed by the one or more processors, cause the one or more processors to perform operations comprising:

accessing map data describing a plurality of travel way portions;

accessing constraint data descriptive of a set of the plurality of travel way portions having associated navigational constraints, the constraint data comprising a depart constraint for a first travel way portion of the plurality of travel way portions, wherein the depart constraint specifies that an autonomous vehicle is not permitted to enter the first travel way portion from another travel way portion that does not have a depart constraint but is permitted to enter the first travel way portion from another travel way portion that does have a depart constraint;

determining a travel route for navigating the autonomous vehicle based at least in part from the map data evaluated relative to the constraint data including the depart constraint, the travel route entering the first travel way portion from a second travel way portion that has a depart constraint; and controlling motion of the autonomous vehicle based at least in part on the determined travel route.

16. The autonomous vehicle of claim 15, wherein the depart constraint also specifies that when the autonomous vehicle is in the first travel way portion the autonomous vehicle may continue to traverse the first travel way portion while inside the first travel way portion and may exit the first travel way portion but that when the autonomous vehicle is outside of the first travel way portion the autonomous vehicle may not enter the first travel way portion, whereby the first travel way portion is given a high traversal cost to bias the autonomous vehicle when in the first travel way portion towards exiting the travel way portion.

17. The autonomous vehicle of claim 15, wherein the determined travel route comprises a plurality of travel way portions, each travel way portion defined by one or more of a travel way identifier, a start point, an end point, a directionality, or connectivity identifiers for other adjacent travel way portions.

18. The autonomous vehicle of claim 15, wherein the one or more communication interfaces receive from the one or more remote computing devices one or more constraint files including the constraint data.

19. The autonomous vehicle of claim 18, wherein each of the one or more constraint files includes one or more polygons, each polygon having a boundary defined relative to a geographic area and an associated application type.

20. The autonomous vehicle of claim 19, wherein the one or more non-transitory computer-readable media further store instructions that when executed by the one or more processors cause the one or more processors to determine the travel route for navigating the autonomous vehicle by:

determining permitted travel way portions, the permitted travel way portions being described by constraint data as (i) laying, a default permit state, (ii) being completely enclosed by a complete inclusion polygon, or (iii) being completely enclosed or partially touched by a partial inclusion polygon;

determining forbidden travel way portions, the forbidden travel way portions being described by the constraint data as (i) having a default forbid state, (ii) being completely enclosed by a complete exclusion polygon, or (iii) being completely enclosed or partially touched by a partial exclusion polygon; and evaluating the map data to account for the permitted travel way portions and the forbidden travel way portions.

* * * * *

UNITED STATES PATENT AND TRADEMARK OFFICE
CERTIFICATE OF CORRECTION

PATENT NO. : 11,287,818 B2
APPLICATION NO. : 16/538275
DATED : March 29, 2022
INVENTOR(S) : Panzica et al.

It is certified that error appears in the above-identified patent and that said Letters Patent is hereby corrected as shown below:

On the Title Page

In Column 2, under "Other Publications", Line 1, delete "et all," and insert --et al.,-- therefor In Column 2, under "Other Publications", Line 2, delete "Extenion," and insert --Extension,-- therefor In the Claims In Column 47, Line 17, in Claim 6, delete "default," and insert --default-- therefor In Column 47, Line 59, in Claim 8, delete "data," and insert --data-- therefor In Column 48, Line 26, in Claim 10, delete "end point;" and insert --end point,-- therefor In Column 50, Line 32, in Claim 20, delete "laying," and insert --having-- therefor Signed and Sealed this
Eighth Day of August, 2023

Katherine Kelly Vidal
*Director of the United States Patent and Trademark Office*